United States Patent
Hatamian

(10) Patent No.: US 11,161,054 B2
(45) Date of Patent: Nov. 2, 2021

(54) MODULAR WATER PURIFICATION DEVICE

(71) Applicant: Mehdi Hatamian, Mission Viejo, CA (US)

(72) Inventor: Mehdi Hatamian, Mission Viejo, CA (US)

( * ) Notice: Subject to any disclaimer, the term of this patent is extended or adjusted under 35 U.S.C. 154(b) by 0 days.

(21) Appl. No.: 16/945,768

(22) Filed: Jul. 31, 2020

(65) Prior Publication Data

US 2021/0039007 A1 Feb. 11, 2021

Related U.S. Application Data

(60) Provisional application No. 62/883,076, filed on Aug. 5, 2019.

(51) Int. Cl.

| C02F 1/14 | (2006.01) |
|---|---|
| B01D 5/00 | (2006.01) |
| C02F 1/04 | (2006.01) |
| B01D 1/00 | (2006.01) |
| C02F 103/08 | (2006.01) |

(52) U.S. Cl.
CPC ......... *B01D 1/0017* (2013.01); *B01D 1/0029* (2013.01); *B01D 1/0082* (2013.01); *B01D 5/006* (2013.01); *B01D 5/0042* (2013.01); *C02F 1/043* (2013.01); *C02F 1/14* (2013.01); *C02F 2103/08* (2013.01); *C02F 2201/007* (2013.01); *C02F 2209/02* (2013.01)

(58) Field of Classification Search
CPC ..... C02F 1/04–18; B01D 5/006; B01D 3/007; B01D 1/0011; B01D 1/0017; B01D 1/0029; B01D 1/0035; B01D 1/0088; B01D 1/26; B01D 5/0042; H02S 20/30

See application file for complete search history.

(56) References Cited

U.S. PATENT DOCUMENTS

| 3,506,543 | A | * | 4/1970 | Cross ........................ C02F 1/18 |
|---|---|---|---|---|
| | | | | 203/10 |
| 6,139,726 | A | | 10/2000 | Greene |
| 6,182,453 | B1 | | 2/2001 | Forsberg |
| 6,272,873 | B1 | | 8/2001 | Bass |
| 7,559,204 | B2 | | 7/2009 | Hatamian et al. |
| 10,220,329 | B2 | * | 3/2019 | Hao ........................ B01D 5/009 |
| 2001/0023591 | A1 | | 9/2001 | Maeda et al. |
| 2005/0269254 | A1 | | 12/2005 | Roitman |

(Continued)

OTHER PUBLICATIONS

Riffat, S.B., et al., "Thermoelectrics: a review of present and potential applications," Applied Thermal Engineering, 2003 (month unknown), Pergamon, vol. 23, pp. 913-935.

*Primary Examiner* — Jonathan Luke Pilcher

(74) *Attorney, Agent, or Firm* — Makoui Law, PC; Ali Makoui

(57) ABSTRACT

A water purification device comprising a pre-purified water reservoir for storing pre-purified water, a water vapor chamber for receiving water vapor generated from heating the pre-purified water in the pre-purified water reservoir, a condensation chamber for receiving the water vapor and condensing the water vapor into purified water, and a Peltier device comprising a hot side and a cold side. The hot side of the Peltier device heats the pre-purified water into water vapor and the cold side of the Peltier device condenses the water vapor into purified water.

19 Claims, 22 Drawing Sheets

(56) References Cited

U.S. PATENT DOCUMENTS

| | | | |
|---|---|---|---|
| 2007/0262011 A1 | 11/2007 | Hatamian et al. | |
| 2013/0276883 A1* | 10/2013 | Belaidi | H02S 20/22 |
| | | | 136/259 |
| 2018/0280829 A1* | 10/2018 | Hao | B01L 3/16 |
| 2018/0305222 A1* | 10/2018 | Benz | C02F 1/042 |
| 2019/0375656 A1* | 12/2019 | Konig | B01D 5/0039 |

* cited by examiner

MODULAR WATER PURIFICATION DEVICE

CLAIM OF BENEFIT TO PRIOR APPLICATIONS

This application claims the benefit of U.S. Provisional Patent Application Ser. No. 62/883,076, filed on Aug. 5, 2019. The contents of U.S. Provisional Patent Application 62/883,076 are hereby incorporated by reference.

BACKGROUND

Population growth and industrial advances have resulted in increased fresh water demand for domestic, farming, and industrial uses. As demand for freshwater increases, traditional sources of freshwater such as reservoirs, wells, rivers, and lakes are becoming depleted.

The vast amount of salt water in the oceans, brackish water in estuaries and aquifers, brine in the Earth's surface and crust, and water in rivers and lakes may be purified for use as fresh water for different applications. Different purification and desalination techniques are used to produce purified water. These techniques are generally expensive to implement, require large amount of energy, and the resulting purification and desalination plants are not modular and scalable.

BRIEF DESCRIPTION OF THE DRAWINGS

The various embodiments of the present modular water purification device now will be discussed in detail with an emphasis on highlighting the advantageous features. These embodiments depict the novel and non-obvious modular water purification device shown in the accompanying drawings, which are for illustrative purposes only. These drawings include the following figures, in which like numerals indicate like parts.

DETAILED DESCRIPTION

One aspect of the present embodiments includes the realization that purifying a large amount of water for municipal, farming, or industrial use requires large plants that are expensive and consume large amount of electricity. Such plants are time consuming to construct and are difficult to repair. The plants that vaporize pre-purified water and condensate the water vapor into purified water need compressors and refrigerants. The compressors have moving parts that may break down. The refrigerants may pollute the environment and may contribute to the greenhouse gas effect.

Some of the present embodiments solve the aforementioned problems by providing a modular water purification device and may be connected to similar devices to form a cascade of water purification devices. Cascading the modular water purification devices provides scalability by adding or removing individual devices. The modular devices may provide health status and performance metrics. Faulty devices may quickly be identified and replaced.

Each modular water purification device may have a valve for taking in pre-purified water (e.g., salt water, brackish water, brine, water from lakes, rivers, wells). The cascade may go repeatedly through a fill cycle, followed by a water purification cycle, followed by a wash cycle. During the fill cycle, a pre-purified water reservoir in each modular device is filled with pre-purified water. During the water purification cycle, the pre-purified water is vaporized and condensed into purified water. The purified water, in some embodiments may be transferred through the cascade and collected into a reservoir. The purified water, in other embodiments, may be transferred out of each individual modular device into one or more reservoirs.

Some of the present embodiments use a Peltier device to heat the pre-purified water into water vapor and to condense the water vapor into purified water. The Peltier device creates a cooling effect without a compressor, refrigerants, or moving parts. The Peltier devices are durable, consume small amount of energy, easy to diagnose, and easy to replace. Some of the present embodiments use heat directly received from the Sun to heat the pre-purified water and/or to generate water vapor. Some of the present embodiments use electricity generated from solar cells to heat the pre-purified water and/or to generate water vapor. Some of these embodiments may receive enough energy directly from the Sun and/or from solar panels that the water purification cascade may work as a standalone system without needing external sources of energy, for example, from a municipal power grid.

Figure 1A:
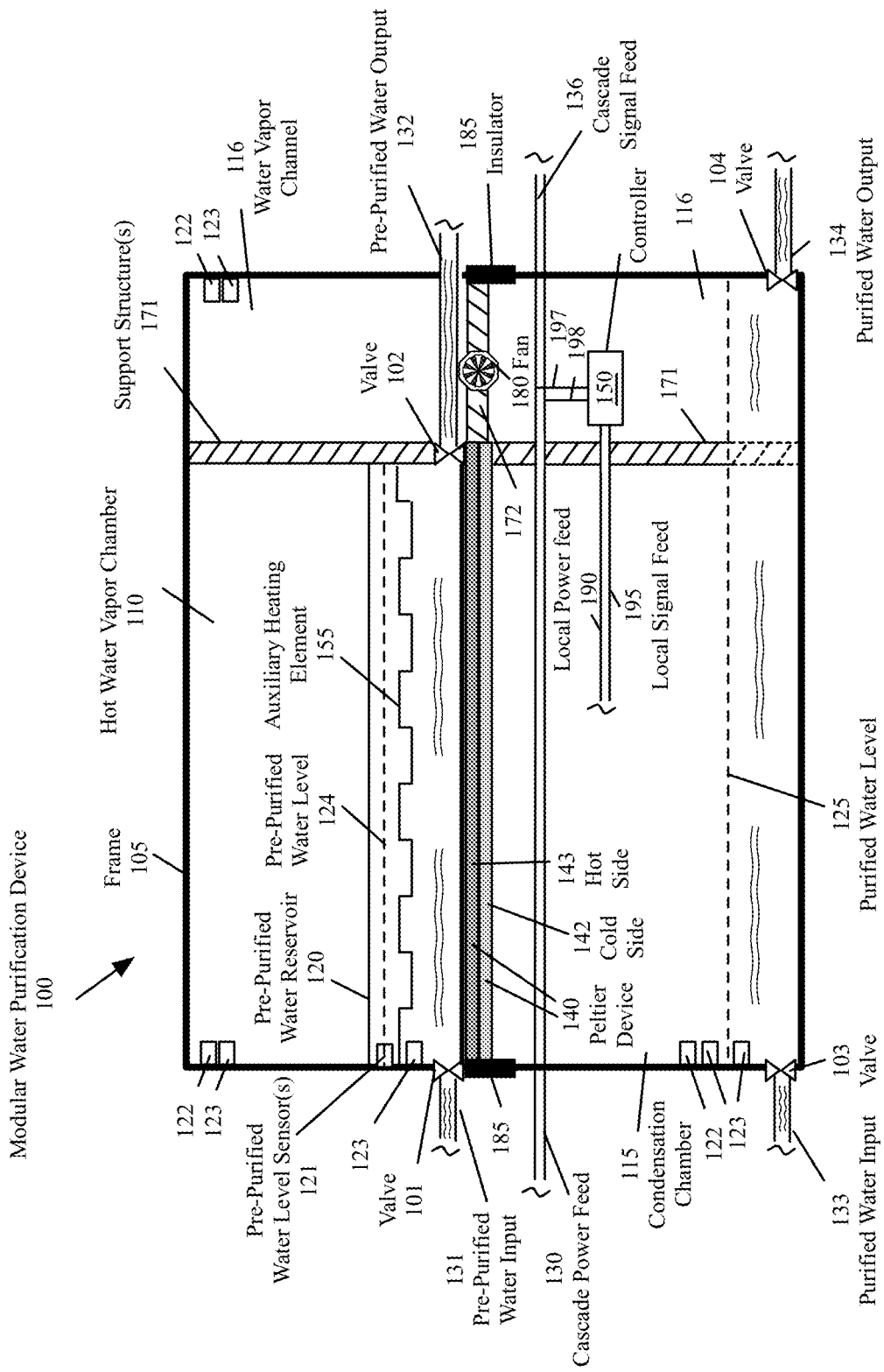
FIG. 1A is a front elevational view of one example embodiment of a modular water purification device where the purified water may be cascaded through several modular water purification devices, according to various aspects of the present disclosure.

FIG. 1A is a front elevational view of one example embodiment of a modular water purification device where the purified water may be cascaded through several modular water purification devices, according to various aspects of the present disclosure. The modular water purification device 100 (also referred to as modular desalination device when the device is used for desalinating salt water, brackish water, or brine water) may be used as a portable device or may be anchored, for example, to a platform. The modular water purification device 100 may be connected to several other modular water purification devices to form a cascade for purifying water.

With reference to FIG. 1A, the modular water purification device 100 may include a frame 105, several valves 101-104, a hot water vapor chamber 110, a condensation chamber 115, a water vapor channel 116, a pre-purified water reservoir 120, one or more water level sensors 121, one or more humidity sensors 122, one or more temperature sensors 123, a cascade power feed 130, a cascade signal feed 136, several pipes (or channels) 131-134, a thermoelectric cooler (or Peltier device) 140, a controller 150, one or more auxiliary heating elements 155, one or more support structures (e.g., beams, poles, columns, etc.) 171-172, a fan 180, insulators 185, a local power feed 190, and a local signal feed 195.

The valve 101 may bring pre-purified water through the pre-purified water input pipe (or channel) 131. Examples of the pre-purified water include, without any limitations, salt water from the oceans, salt water from lakes, brackish water from estuaries and aquifers, brine from the Earth's surface and crust, fresh water from rivers, lakes, well, tap water that may require purification, etc. When the modular water purification device 100 is the first device in the cascade, the pre-purified water may come from an outside water source. When the modular water purification device 100 is not the first device in the cascade, the pre-purified water may come from the previous device in the cascade.

The pre-purified water may be stored in the pre-purified water reservoir 120. The pre-purified water reservoir 120 may be made of a non-corrosive material such as, without limitations, galvanized steel, aluminum, etc. The pre-purified water reservoir 120, in some embodiments, may be in the shape of an open bowl, which may be secured to the sides of the frame 105 and the support structure(s) 171 such that no pre-purified water may leak into the condensation chamber 115.

In some of the present embodiments, a thin metal plate (not shown), made of a non-corrosive material such as, without limitations, galvanized steel, aluminum, etc., may cover the hot side 143 of the Peltier device 140, may function as the bottom of the pre-purified water reservoir 120, and may seal the water reservoir 120 such that no pre-purified water may leak into the condensation chamber 115. The valve 102 may transfer the pre-purified water out of the modular water purification device 100 trough the pre-purified water output channel 132.

In some of the present embodiments (such as the embodiment depicted in FIG. 1A), the purified water may be channeled through the cascade by the valves 103 and 104 through purified water pipes 133 and 134. In other embodiments (such as the embodiment shown in FIG. 1B), the purified water may be transferred out of each modular water purification device 100 into one or more external purified water reservoirs. The pre-purified and purified water channels may be made of material such as, without limitations, polyvinyl chloride (PCV), Chlorinated polyvinyl chloride (CPVC), copper, galvanized steel, galvanized iron, chromed copper, etc.

Figure 1B:
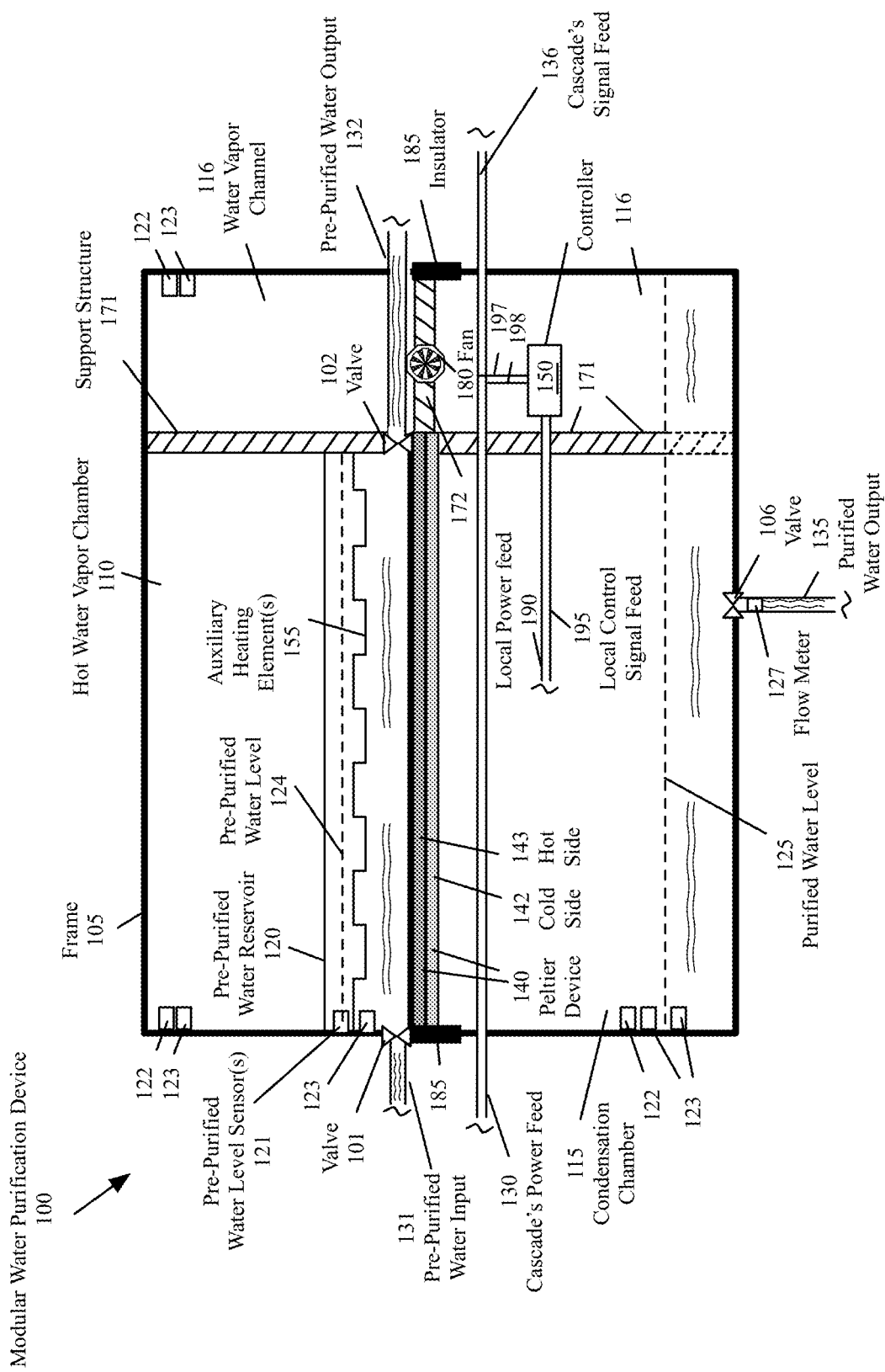
FIG. 1B is a front elevational view of one example embodiment of a modular water purification device where the purified water is transferred out of each modular water purification device, according to various aspects of the present disclosure.

FIG. 1B is a front elevational view of one example embodiment of a modular water purification device where the purified water is transferred out of each modular water purification device, according to various aspects of the present disclosure. With reference to FIG. 1B, the purified water that is collected at the bottom of the frame 105 may be transferred out of the modular water purification device 100 through a valve 106 and the purified water output channel 135. Some embodiments may include a mineral mixer on the purified water output 135 to add minerals to the purified water. Further details of the mineral mixers of the present embodiments are provided below with reference to the mineral mixer 1605 of FIG. 16.

As described further below with reference to FIG. 3, the purified water may be transferred from the purified water output channel 135 of FIG. 1B into one or more external reservoirs. Although only one valve 106 and one purified water output channel 135 are shown in FIG. 1B, the modular water purification device 100, in some embodiments, may have several purified water output channels and the corresponding valves for transferring the purified water out of the device. In addition, since the purified water is not channeled through the cascade, different modular water purification devices (e.g., different models) may have different number of purified water output channels.

Figure 2:
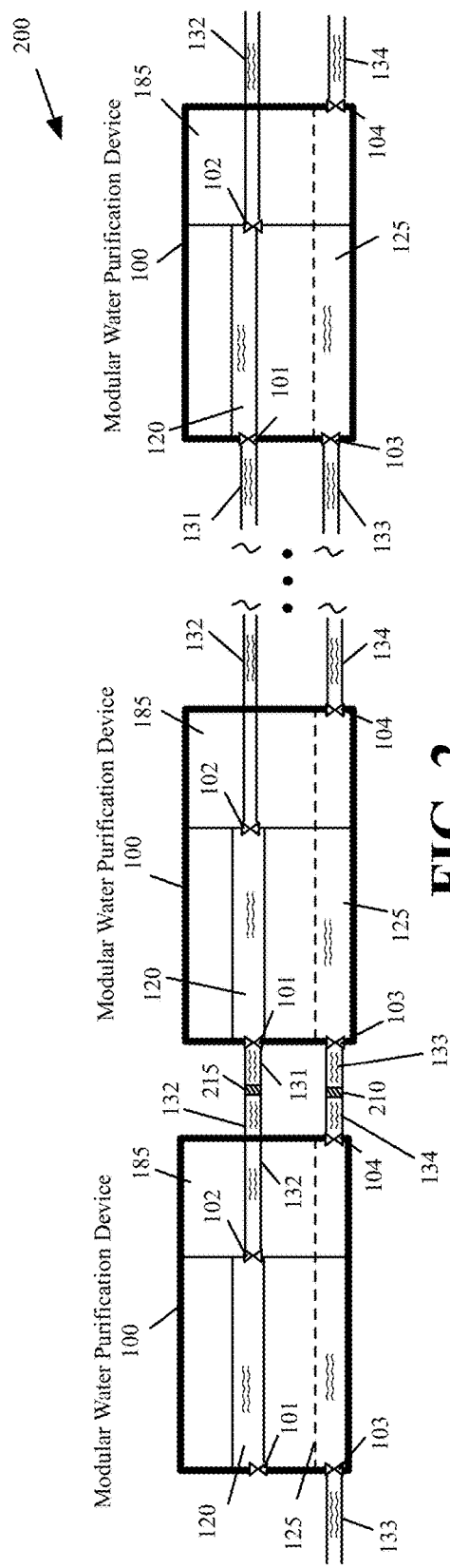
FIG. 2 is a front elevational view of one example embodiment of a cascade of modular water purification devices where the purified water may be cascaded through several modular water purification devices, according to various aspects of the present disclosure.

FIG. 2 is a front elevational view of one example embodiment of a cascade 200 of modular water purification devices where the purified water may be cascaded through several modular water purification devices, according to various aspects of the present disclosure. The modular water purification devices 100 of FIG. 2 may be similar to the modular water purification device 100 of FIG. 1A. For simplicity, FIG. 2 only shows the interconnection of input and output channels of the pre-purified water and the purified water of the modular water purification devices 100 in the cascade 200.

With reference to FIG. 2, the valve 101 may bring the pre-purified water into the modular water purification device 100. The valve 102 may transfer the pre-purified water out of the modular water purification device 100. The pre-purified water output channel 132 of each device (except the last device in the cascade 200) may be connected to the pre-purified water input channel 131 of next device in the cascade 200, for example and without limitation, through a pipe fitting 215. When the modular water purification device 100 is the last device in the cascade 200, the pre-purified water may be transferred outside the cascade 200.

The valve 103 may bring purified water into the modular water purification device 100 through the purified water input pipe (or channel) 133. The valve 104 may transfer purified water out of the modular water purification device 100 through the purified water output pipe (or channel) 134. The purified water output channel 134 of each device (except the last device in the cascade 200) may be connected to the purified water input channel 133 of next device in the cascade 200, for example and without limitation, through a pipe fitting 210. When the modular water purification device 100 is the first device in the cascade 200, the valve 103 may be closed and no purified water may come from into the device. When the modular water purification device 100 is not the first device in the cascade 200, the purified water may come from the previous device in the cascade.

Figure 3:
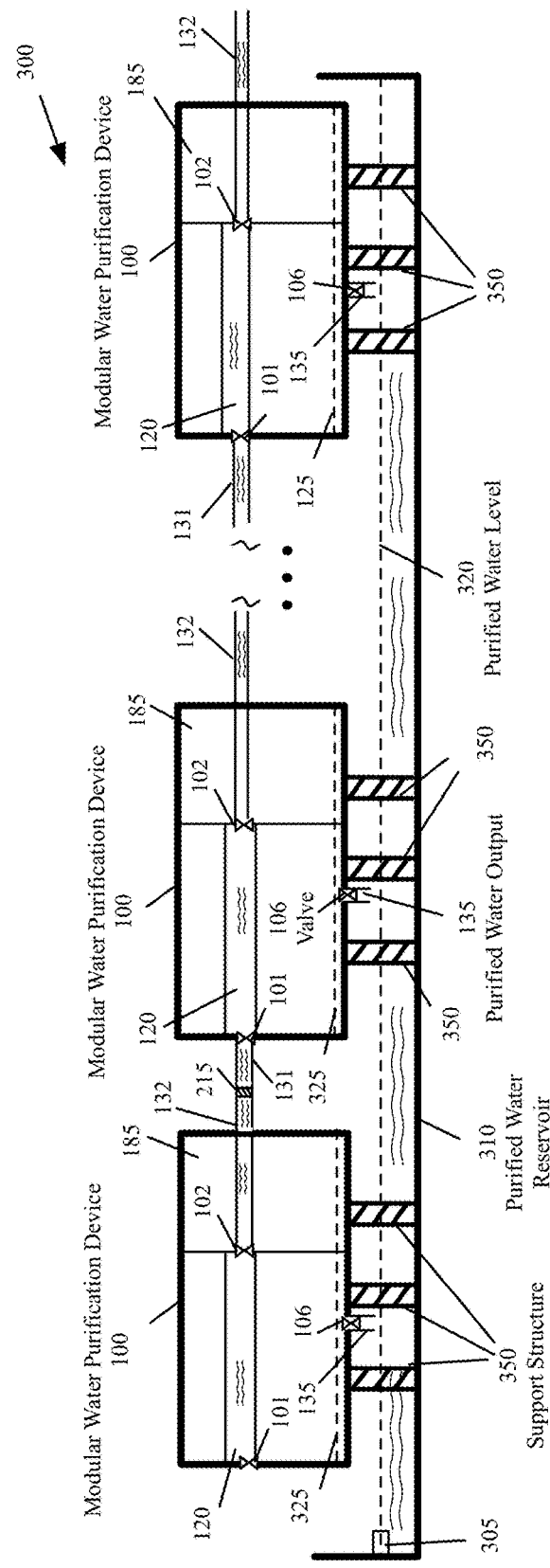
FIG. 3 is a front elevational view of one example embodiment of a cascade of modular water purification devices where the purified water is transferred out of each modular water purification device, according to various aspects of the present disclosure.

FIG. 3 is a front elevational view of one example embodiment of a cascade 300 of modular water purification devices where the purified water is transferred out of each modular water purification device, according to various aspects of the present disclosure. The valves 101-102 in FIG. 3 may be similar to the valves 101-102 in FIG. 2, and the pre-purified water channels 131 and 132 in FIG. 3 may be connected to each other, as described above with reference to FIG. 2.

With reference to FIG. 3, the purified water is transferred out of each modular water purification device 100 into one or more external reservoirs 310 (only one reservoir is shown). Each modular water purification device 100 may be supported by one or more support structures 350. The support structures may be, without limitation, in the form of poles, tubes, columns, etc., such that the movement of purified water inside the purified water reservoir(s) is not blocked.

Each modular water purification device 100 may include one or more valves 106 and the corresponding purified water output channel(s) 135 (e.g., one or more pipes) for transferring the purified water out of the modular water purification device 100. The cascade 300 may include one or more sensors 305 for measuring the level 320 of the purified water inside the purified water reservoir(s) 310.

With reference to FIGS. 1A-1B, the valves 101-104 and 106 may be electronically controllable. In some of the present embodiments, the valves 101-104 and 106 may receive control signals through the local control signal feed 195 to open or close. For example, the valves 101-104 and 106 may receive the signals from the controller 150 (or from a controller outside the modular water purification device 100).

The controller 150 may be (or may include) a processing unit such as a processor or microprocessor. The controller 150 may include (or may be associated with) volatile memory and non-volatile storage. The controller may receive, for example, from one or more flow meters (not shown) and/or calculate the amount of the pre-purified water that comes into the modular water purification device 100, the amount of the pre-purified water that is transferred out, the amount of the purified water that comes in (in case of FIG. 1A), and/or the amount of the pre-purified water that is transferred out using the characteristics of the valves 101-104 and 106 and the amount of time each valve is kept opened.

The controller may receive and/or calculate other metrics such as, without limitations, the humidity, temperature, water level, pressure, etc., from different sensors of the modular water purification device 100.

As described below, the modular water purification device 100 may go through several cycles during its operation and the valves 101-104 may receive signals to open and close during different cycles. Although only one valve is shown for each function of bringing in the pre-purified water, bringing in the purified water, transferring the pre-purified water out, and transferring the purified water out, some of the present embodiments may use more than one valve and the associated channels for some of these functions.

Figure 4:
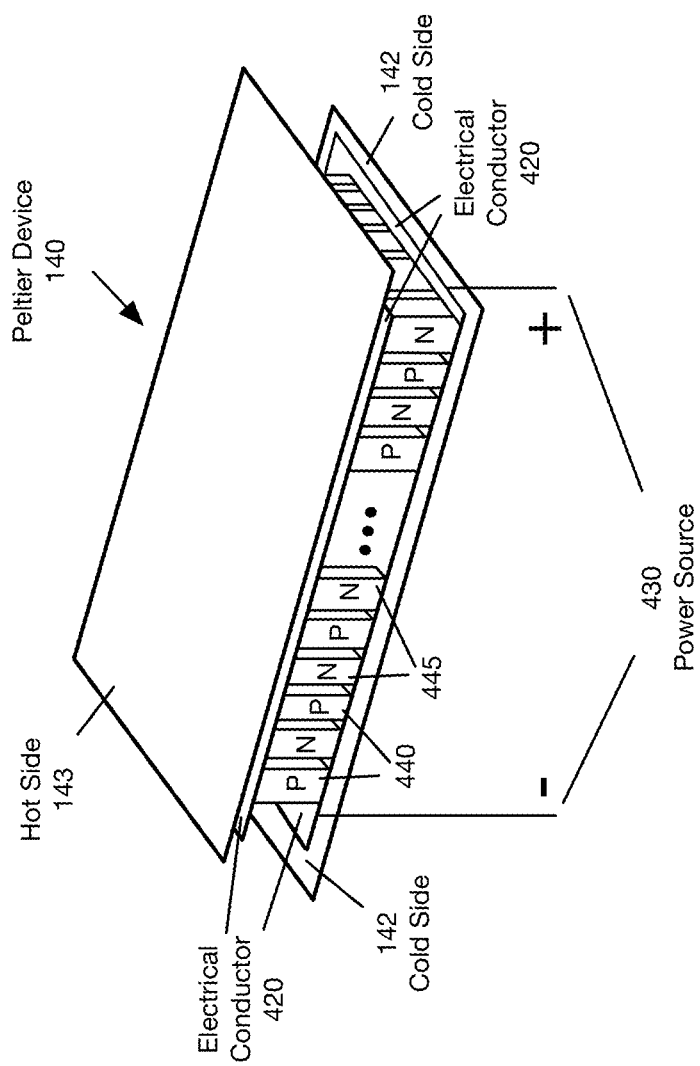
FIG. 4 is an upper front perspective view of a Peltier device, according to various aspects of the present disclosure.

With further reference to FIGS. 1A-1B, the modular water purification device 100 may include a Peltier device 140. The Peltier device is a thermoelectric cooling device that uses Peltier effect to create a heat flux at the junction of two different material. FIG. 4 is an upper front perspective view of a Peltier device, according to various aspects of the present disclosure.

With reference to FIG. 4, the Peltier device 140 may include a cold side 142, a hot side 143, several electrical conductors 420, several p-type semiconductors 440, and several n-type semiconductors 445. The p-type semiconductor may be, for example, p-doped bismuth telluride. The n-type semiconductor may be, for example, n-doped bismuth telluride.

The semiconductors 440-445 are placed thermally in parallel to each and electrically in series. A p-type semiconductor and an n-type semiconductor are placed next to each other as a semiconductor couple. A Peltier device may include from one to hundreds of semiconductor couples. The semiconductors 440-445 are joined with the thermally conductive plates 142 and 143, which are referred to as the cold side and the hot side, respectively. The cold side 142 and the hot side 143 plates may be made of a material such as, for example, ceramic to act as a heat conductor and an electrical insulator.

When a voltage is applied, for example from a power source 430, such as the local power feed 190 (FIGS. 1A-1B), to the electrical conductors 120, a flow of direct current is generated in series across the junction of the semiconductors, causing a temperature difference. The side with the cooling plate 142 absorbs heat, the heat is then moved to the hot side 143 of the Peltier device 140. The Peltier device 140 creates a cooling effect without a compressor, refrigerants, or moving parts.

For the Peltier device 140 to operate properly and efficiently, the heat generated on the hot side 143 must be removed and transferred from the Peltier device 140. In applications such as cooling of processor chips in high performance computers, this heat removal is accomplished via heat sinks placed on the hot side of the device. In the embodiments of the present invention, the water on the hot side 143 of the Peltier device 140 acts as the heat sink and the heat generated on the hot side 143 helps with generating the needed water vapor. The embodiments of the present invention are ideal applications where both the cold 142 and hot 143 sides of the Peltier device 140 are efficiently used to accomplish the water purification task. In contrast, in applications such as cooling of processor chips, extra work must be done to move the heat from the hot side of the Peltier device.

With reference to FIGS. 1A and 1B, the Peltier device 140 may receive power (i.e., electrical power or electricity) from the local power feed 190. The Peltier device's hot side 143 may heat up and evaporate the pre-purified water stored in the pre-purified water reservoir 120. Some of the present embodiments may include one or more auxiliary heating elements 155. The heating element(s) 155 may receive power from the local power feed 190 and may generate heat in addition to the heat generated by the Peltier device's hot side 143 in order to evaporate the pre-purified water. As described below with reference to FIGS. 6A-6F, a portion of the frame 105, in some embodiments, may include glass and/or may generate a lens effect that may transfer heat from the Sun into the top portion of the modular water purification device 100 to heat the pre-purified water and/or to generate water vapor. Other embodiments may only use the Peltier device's hot side 143 to evaporate the pre-purified water.

The Peltier device 140 may be able to create a temperature difference between the hot side 143 and the cold side 142. Depending on the ambient temperature, the temperature of the hot side 143 may reach to a temperature that may boil the pre-purified water. Some of the present embodiments may measure the temperature of the different parts of the modular water purification device 100 (e.g., the temperature of the pre-purified water in the pre-purified water reservoir 120 and/or the temperature of the hot water vapor chamber 110 using one or more temperature sensors 123). In some of these embodiments, the auxiliary heating element(s) 155 may be turned on during the water purification cycle if the temperature of the hot side 143 of the Peltier device 140 is not enough to boil the per-purified water. The auxiliary heating element(s) 155 may be made of metal and may generate heat when electricity is passed through them. The auxiliary heating element(s) 155, in some embodiments, may be inside the pre-purified water reservoir 120 and may be fixed to the pre-purified water reservoir 120 at one or more places.

The Peltier device 140 may be substantially as wide as the pre-purified water reservoir 120. The Peltier device 140, the auxiliary heating element(s) 155, and the pre-purified water reservoir 120 may be supported on three sides by the frame 105 and on one side by the support structure(s) 171. The support structure(s) 171 may be a column, a beam, a pole, or otherwise a structure that does not block the movement of water vapor from the hot water vapor chamber 100 into the water vapor channel 116. As described below with reference to FIG. 11, the Peltier device, in some embodiments, may be on a set of rails on at least two sides to allow easy removal and replacement of the Peltier device 140.

With reference to FIGS. 1A-1B, as the pre-purified water is heated by the Peltier device's hot side 143 (and optionally by other means such as the auxiliary heating element(s) 155 and/or the heat received from the Sun), the hot water vapor rises into the hot water vapor chamber 110. The hot water vapor may move from the hot water vapor chamber 110 into the water vapor channel 116 by convection. Some of the present embodiments may use a fan 180 to move the water vapor from the upper portion of the water vapor channel 116 to the lower portion of the water vapor channel 116 and to the condensation chamber 115.

The fan 180, in some embodiments, may operate at a rate per minutes (RPM) that does not create turbulence in the water vapor channel 116. For example, the fan's RPM may be 1, 2, 5, 10, 20, etc. The fan 180 may be placed on a support structure 172. The support structure 172 may be a column, a beam, a pole, or otherwise a structure that does not block the movement of water vapor from the upper portion of the water vapor channel 116 into the lower portion of the water vapor channel 116. Some of the present embodiments may not use a fan and may allow the water vapor to move from the hot water vapor chamber 110 into the water vapor channel 116 and the condensation chamber 115 by convection. The water vapor in the condensation chamber 115 may come into contact with the Peltier device's cold side 142 and may condense into purified water. The purified water may be collected at the bottom of the frame 105.

Figure 5A:
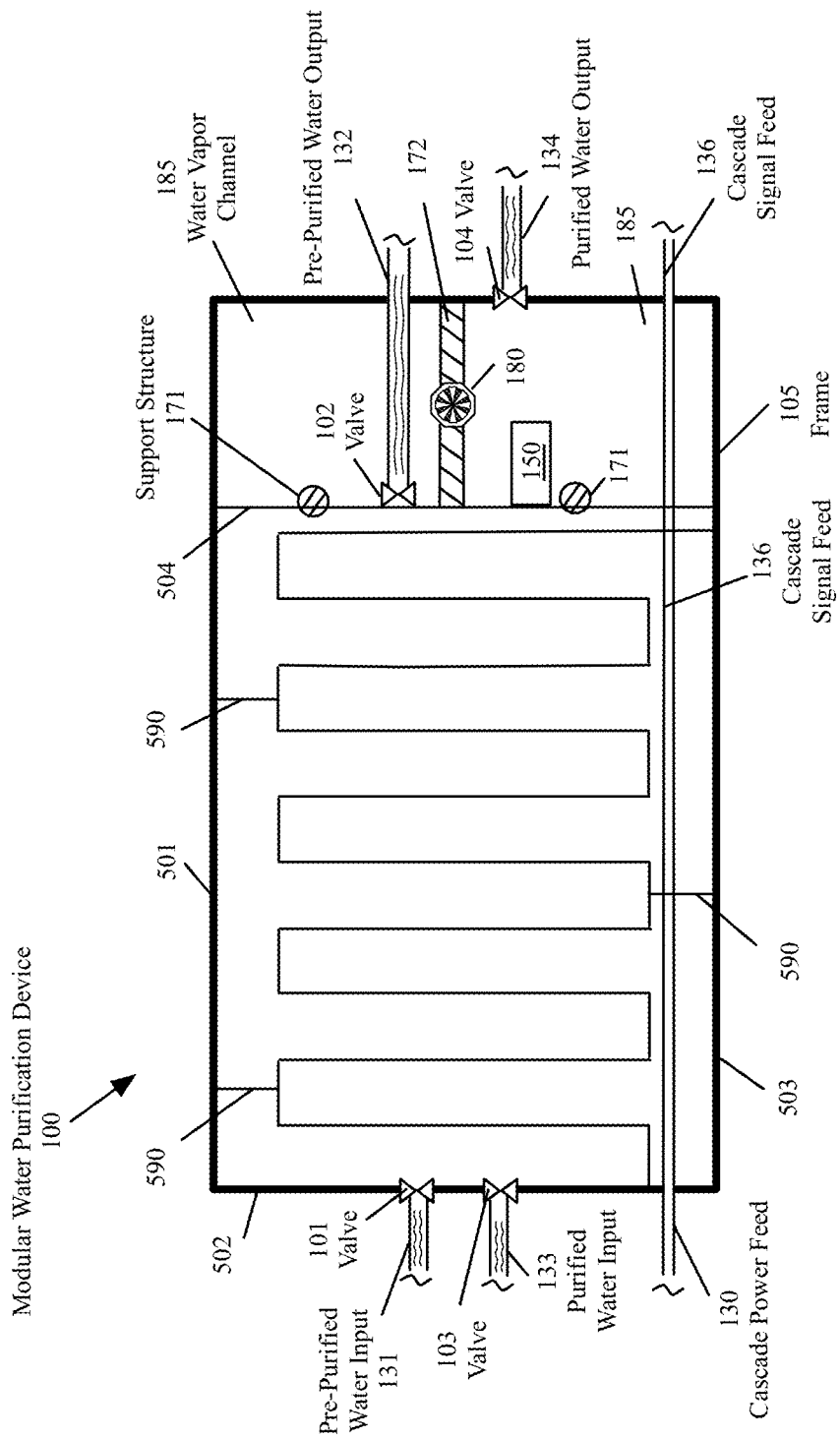
FIG. 5A is a top elevational view of the modular water purification device of FIG. 1A, according to various aspects of the present disclosure.

FIG. 5A is a top elevational view of the modular water purification device of FIG. 1A, according to various aspects of the present disclosure. With reference to FIG. 5A, the Peltier device, the pre-purified water reservoir, the hot water vapor chamber, and the condensation chamber may substantially extend on three sides to the three sides 501-503 of the frame 105 and on one side (as shown by 504) to the interior of the frame 105. The Peltier device and the pre-purified water reservoir may be supported by the support structure(s) 171. The support structures may be one or more beams, bars, poles, etc., for holding the Peltier device and the pre-purified water reservoir.

With further reference to FIG. 5A, the auxiliary heating element(s) 155 may have any arbitrary shape. The auxiliary heating element(s) 155 may be connected to the frame 105 by one or more structures 590 such as rods, beams, poles, etc.

Figure 5B:
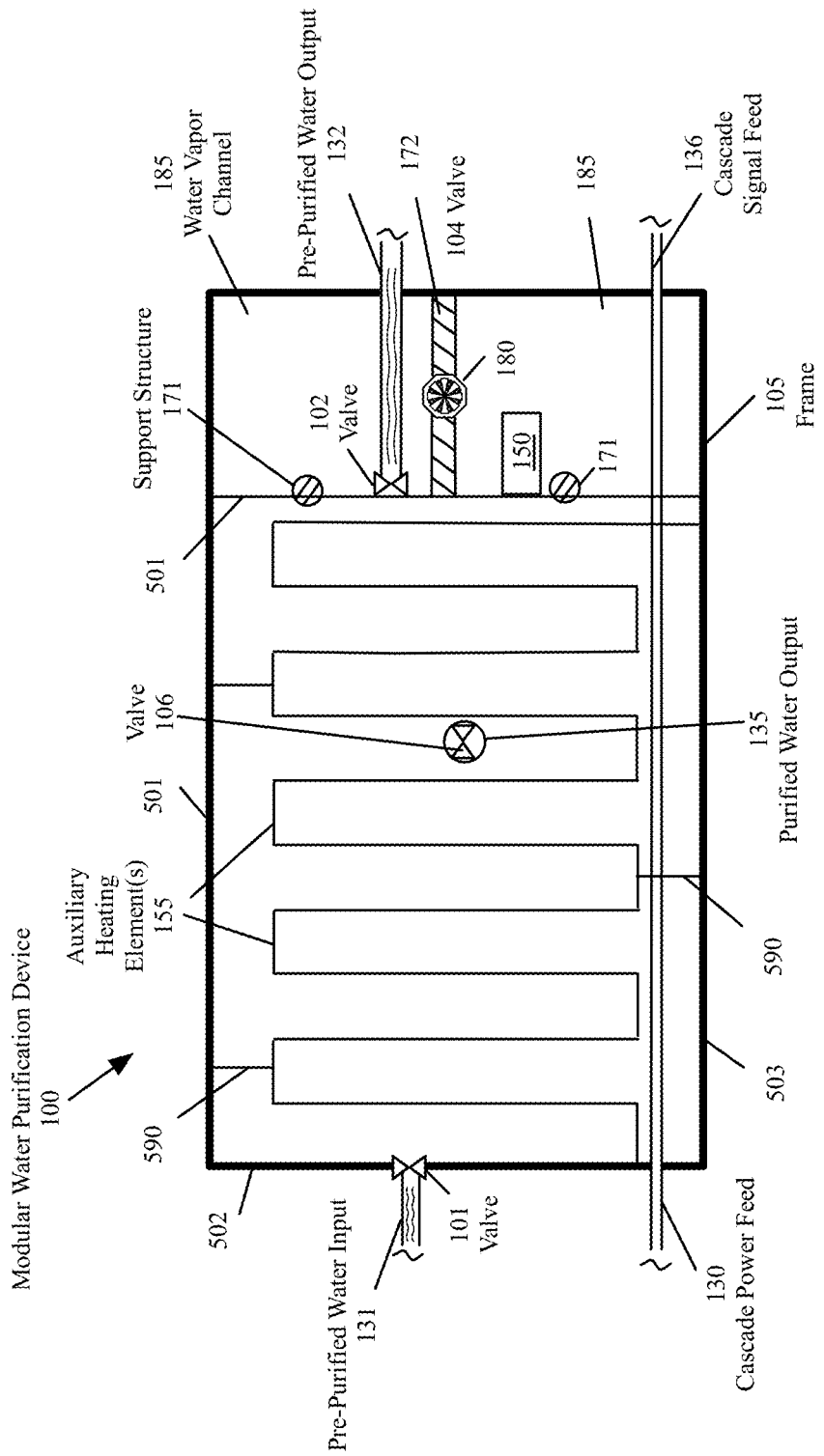
FIG. 5B is a top elevational view of the modular water purification device of FIG. 1B, according to various aspects of the present disclosure.

FIG. 5B is a top elevational view of the modular water purification device of FIG. 1B, according to various aspects of the present disclosure. With reference to FIG. 5B, the modular water purification device 100 may include a purified water output channel 135 and a valve 106 that may transfer the purified water to a reservoir outside the modular water purification device 100. Other components of FIG. 5B may be similar to the components of FIG. 5A.

With reference to FIGS. 5A-5B, the relative location of the pre-purified water input channel 131, the pre-purified water output channel 132, the purified water input channel 133, the purified water output channel 134-135, the cascade power feed 130, the cascade signal feed 136, the support structures 171-172, the fan 180, the controller 150, and the valves 101-105 are shown as example. The location of these components may change in different embodiments as a design choice.

Figure 6A:
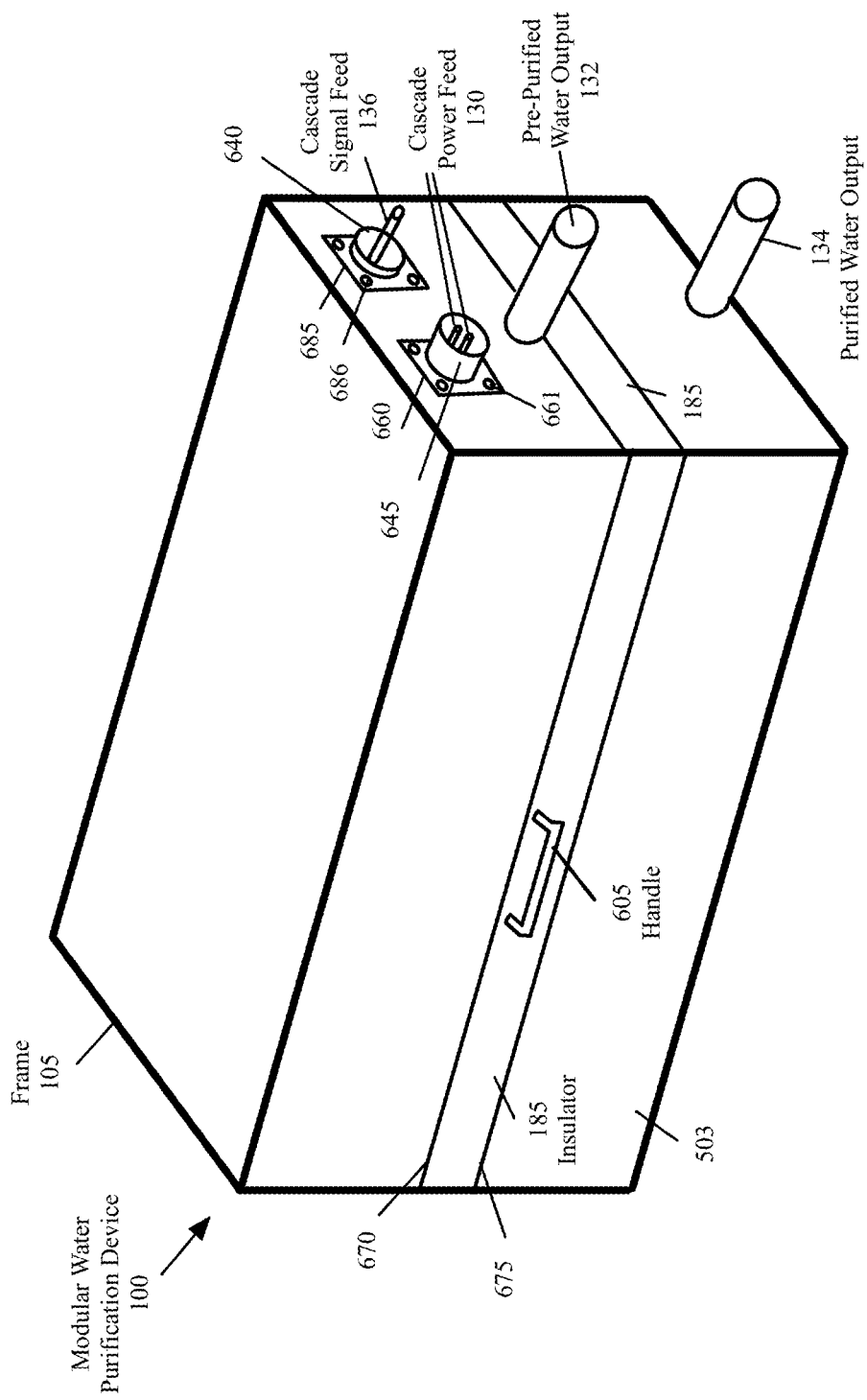
FIG. 6A is an upper front perspective view of one example embodiment of a modular water purification device, according to various aspects of the present disclosure.
Figure 6B:
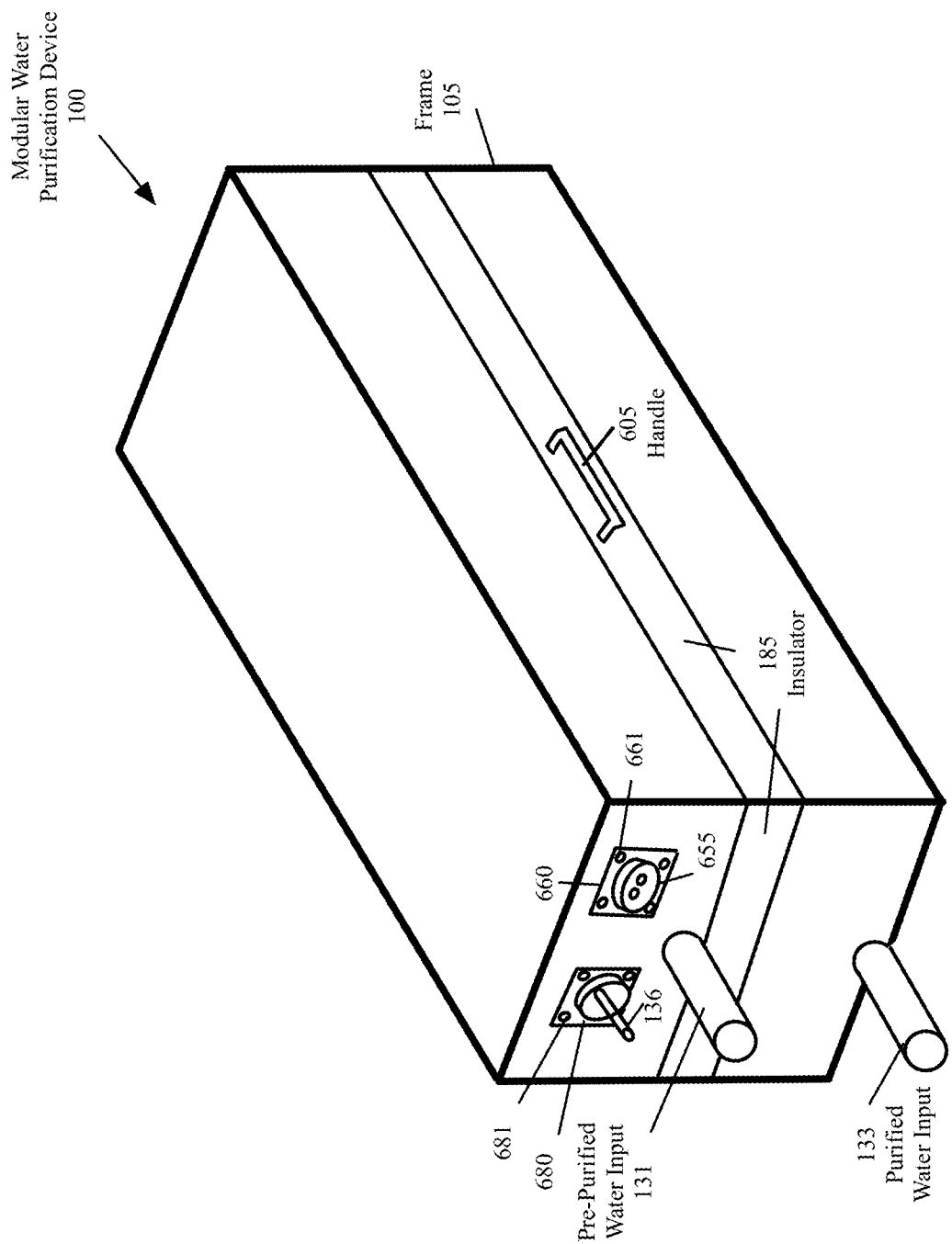
FIG. 6B is an upper rear perspective view of the modular water purification device of FIG. 6A, according to various aspects of the present disclosure.

With reference to FIGS. 1A-1B, the frame 105 may be used to cover the water purification device's components. FIG. 6A is an upper front perspective view of one example embodiment of a modular water purification device, according to various aspects of the present disclosure. FIG. 6B is an upper rear perspective view of the modular water purification device of FIG. 6A, according to various aspects of the present disclosure.

With reference to FIGS. 6A and 6B, the modular water purification device 150 may include a cascade signal feed 136. In some of the present embodiments, the controller 150 (FIGS. 1A-1B) may collect health and status information from different components of the modular water purification device. The controller 150 may calculate performance metrics such as the amount of purified water generated in a time period, the input and output rate of the pre-purified water, etc. The controller 150 may receive data regarding temperature, pressure, humidity, flow rate, water level, etc., from different sensors of the modular water purification device 100. The controller 150 may filter the data, calculate different metrics, and/or store raw and calculated metrics. As described below with reference to FIG. 11, the controller may communicate the information with one or more electronic devices through the cascade signal feed 136.

The cascade signal feed 136 may go through the modular water purification devices by connecting the cascade signal feeds 136 of the adjacent devices. The cascade signal feed wire(s) 136 wires may go through a tube 640 that may be accessible through a fixture 685 that is attached to the frame 105 by one or more bolts or screws 686. The cascade signal feed 136 may be one or more wires. Some embodiments may include one or more antennas (not shown) that may be used by the controller, in addition to, or in lieu of, the cascade signal feed, to communicate with one or more electronic devices.

With continued reference to FIGS. 6A and 15B, the modular water purification device 150 may include a cascade power feed 130. The cascade power feed 130 may be two or more wires that may go through a tube 645 that may be accessible through a fixture 660 that is attached to the frame 105 by one or more bolts or screws 661.

In some of the present embodiments, the top portion (e.g., the portion above the line 670) of the frame 105 that covers the hot water vapor chamber 110 (FIGS. 1A-1B) and the pre-purified water reservoir 120 may be made of a transparent material such as glass that allow the sunlight to enter the top portion 670 of the frame 105 to heat up the pre-purified water and/or generate hot water vapor. The extra energy received from the Sun through the transparent portion of the frame may be used in addition to the energy received from the Peltier device and/or the auxiliary heating element(s) 155 (FIGS. 1A-1B). The transparent material, in some embodiments, may be made to create a lens effect to further intensify the sunlight entering the top portion 670 of the frame 105.

With further reference to FIGS. 6A and 6B, the lower portion (e.g., the portion below the line 670) of the frame 105 that covers the condensation chamber 115 (FIGS. 1A-1B) may be made of opaque material to block the sunlight. The lower portion of the frame 105, in some embodiments, may be covered by an insulator and/or may be made of insulating material to thermally insulate the lower portion of the frame 105. The lower portion of the frame 105, in some embodiments, may be double layered with vacuum between the two layers to provide insulation.

With further reference to FIGS. 6A and 6B, a portion the frame 105 (e.g., the portion between the lines 670 and 675) may be covered by an insulator 185. In the depicted embodiment, the insulator covers the area of the frame 105 that is in contact with the Peltier device 140 (FIGS. 1A-1B) to prevent heat exchange between the Peltier device and the outside of the modular water purification device 100. In some of the present embodiments, the Peltier device may be connected to a handle 605 that may allow the easy removal and insertion of the Peltier device into the frame 105.

In some of the present embodiments, a portion of the frame may be detachable (e.g., the portion on side 503 that is directly under the insulator 185) to allow the handle to be used by a human or a robot to remove the Peltier device and the detachable portion of the frame and insert another Peltier device that is connected to a handle and a similar detachable portion of the frame.

In some embodiments, the Peltier device, the corresponding removable portion of the frame, and a section of the insulator 185 that is connected to the removable portion of the frame may come off by pulling the handle 605 and may be replaced by another Peltier device, a corresponding removable portion of the frame, and a corresponding section of the insulator.

With reference to FIG. 6A, the pre-purified water output channel 132 transfers the pre-purified water out of the modular water purification device 100. In the embodiments that transfer the purified water through the cascade, the purified water output channel 134 transfers the purified water out of the modular water purification device 100.

With reference to FIG. 6B, the pre-purified water input channel 132 may receive the pre-purified water into the modular water purification device 100. In the embodiments that transfer the purified water through the cascade, the purified water input channel 134 may receive the purified water into the modular water purification device 100.

Figure 6C:
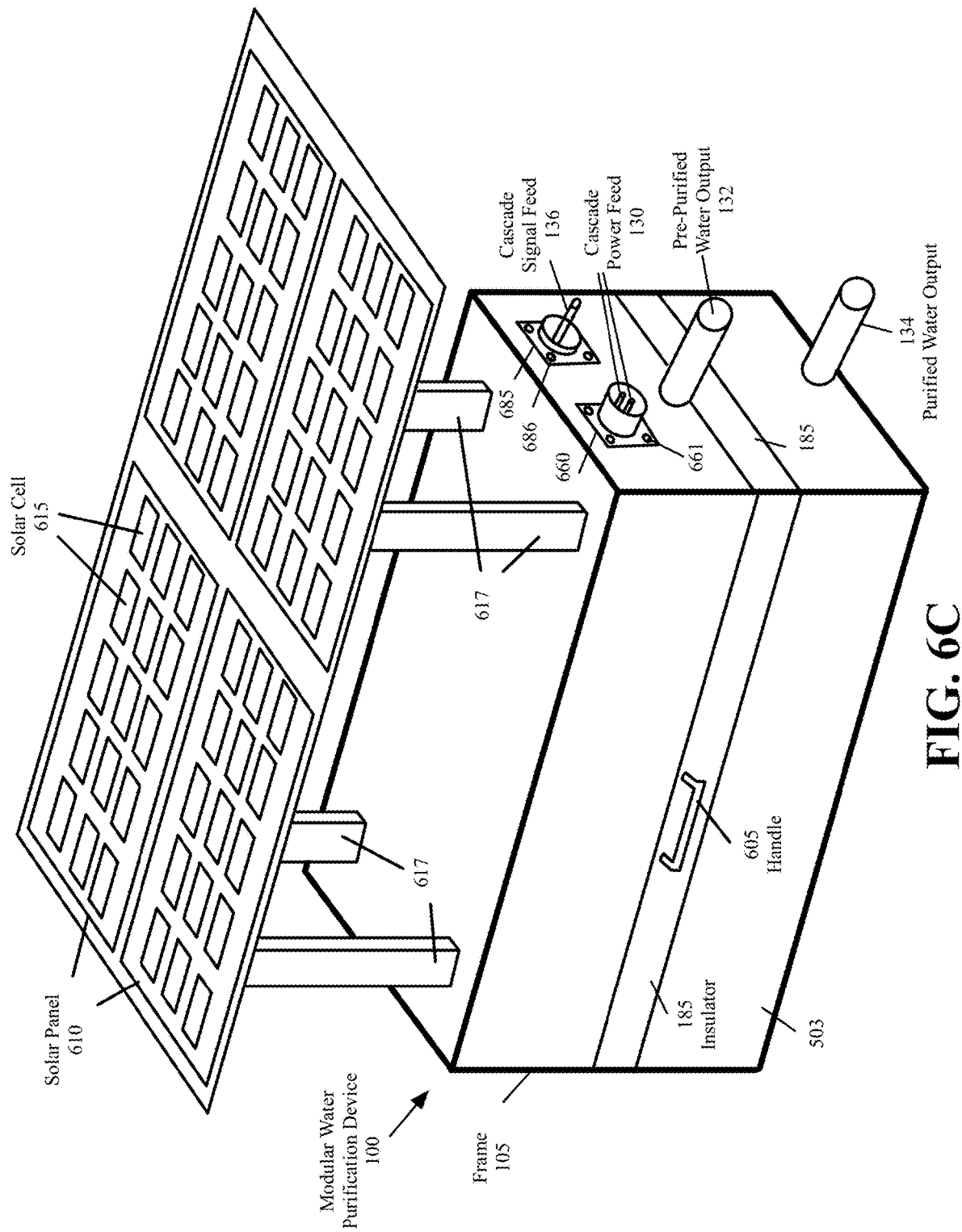
FIG. 6C is an upper front perspective view of one example embodiment of a modular water purification device that includes one or more solar panels, according to various aspects of the present disclosure.
Figure 6D:
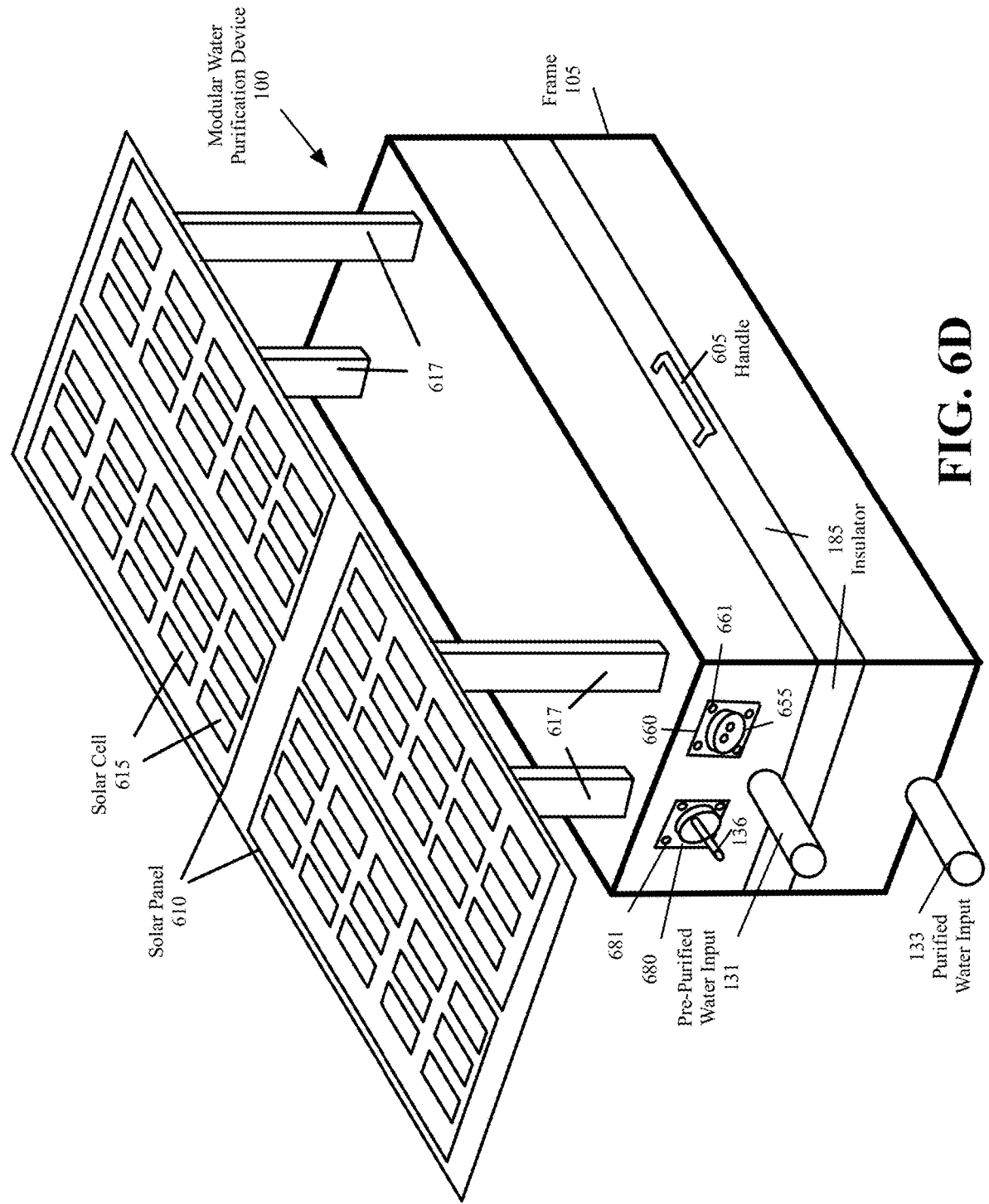
FIG. 6D is an upper rear perspective view of the modular water purification device of FIG. 6C, according to various aspects of the present disclosure.

The modular water purification device may optionally include one or more solar panels. FIG. 6C is an upper front perspective view of one example embodiment of a modular water purification device that includes one or more solar panels, according to various aspects of the present disclosure. FIG. 6D is an upper rear perspective view of the modular water purification device of FIG. 6C, according to various aspects of the present disclosure.

With reference to FIGS. 6C and 6D, the modular water purification device 150 may include one or more solar panels 610. Each solar panel 610 may include one or more solar cells 615. The solar panel(s) 610 may provide power to the modular water purification device 100 and/or to the cascade.

The solar panel(s) 610, in some embodiments, may be connected by one or more support structures 617 to the frame 105. In other embodiments, the solar panel(s) 610 may be directly connected to the frame 105.

Figure 6E:
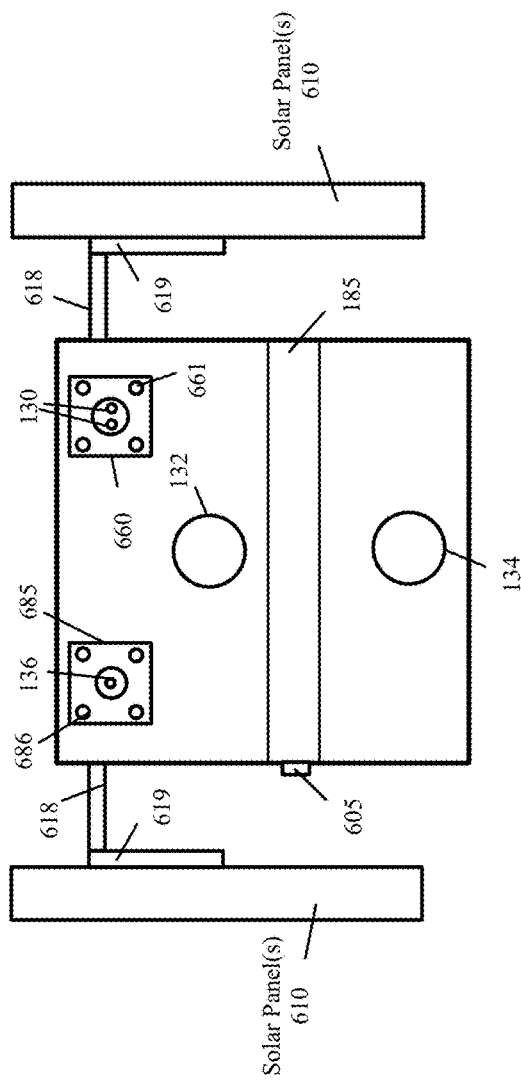
FIGS. 6E and 6F are side elevational views of one example embodiment of a modular water purification device that includes one or more foldable solar panels, according to various aspects of the present disclosure.
Figure 6F:
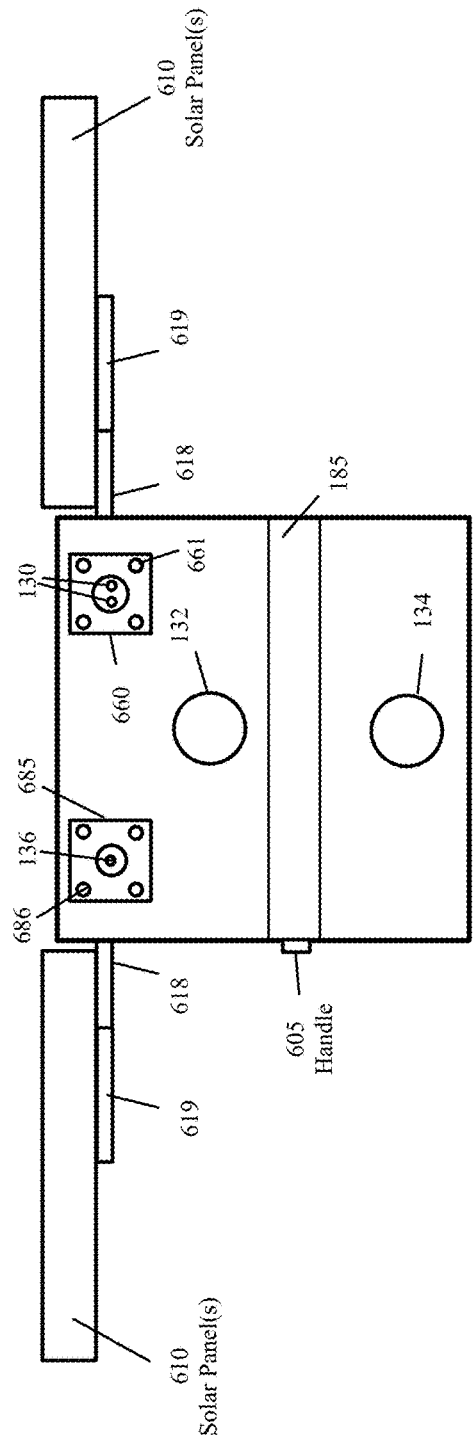

In some of the present embodiments, the solar panels may be attached to the frame by one or more foldable arms to facilitate shipping and moving around the frame and the solar panels as a single unit. FIGS. 6E and 6F are side elevational views of one example embodiment of a modular water purification device that includes one or more foldable solar panels, according to various aspects of the present disclosure.

With reference to FIGS. 6E and 6F, the solar panel(s) 610 may be attached to the frame 105 by one or more fixed arms 618 and one or more foldable arms. FIG. 6E shows the arm(s) 619 being folded (e.g., during transportation of the modular water purification device). FIG. 6F shows the arm(s) 619 being extended (e.g., during the operation of the modular water purification device). Other components of FIGS. 6C-6F may be similar to the components of 6A-6B, described above.

With reference to FIGS. 1A-1B, the controller 150 may receive power from the cascade power feed 130 (e.g., through the connection 197) and may provide power to other components of the modular water purification device 100 through the local power feed 190. The controller 150 may communicate with one or more external electronic devices through the cascade signal feed 136 and the connection 198. In the embodiments that include an antenna, the controller 150 may communicate with one or more external electronic devices through the antenna.

The controller 150 may control the operation of and/or may receive signals from the valves 101-104, the hot water level sensor(s) 121 measuring the pre-purified water level 124, the auxiliary heating element(s) 155, the fan 180, and the Peltier device 140 through the local signal feed 195.

In the embodiment depicted in FIGS. 1A-1B, the controller 150 may receive power from the cascade power feed 130 (e.g., through the connection 197) and may provide power to other components of the modular water purification device 100 through the local power feed 190. In other embodiments, the cascade power feed 130 may be directly connected to the local power feed 190.

The controller 150 may control the operation of the valves 101-102, 103-104 (FIG. 1A), 106 (FIG. 1B), the auxiliary heating element(s) 155, the Peltier device 140, and/or the fan 180. For example, as described further below, the controller 150 may send signals to turn theses device on/off (or open/close) during different cycles of the modular water purification device 100.

The controller 150 may send and/or receive signals from one or more external electronic devices through the cascade signal feed 136 and the connector 198. The controller 150 may send to and/or receive signals from the valves 101-102, 103-104 (FIG. 1A), 106 (FIG. 1B), the pre-purified water level sensor(s) 121, the humidity sensor(s) 122, the temperature sensor(s) 123, the Peltier device 140, the auxiliary heating element(s) 155, the fan 180, the pressure sensors (not shown), the flow meter sensors (not shown), etc. The controller 150 may send and receive the signals through the local control signal feed 195.

Figure 7:
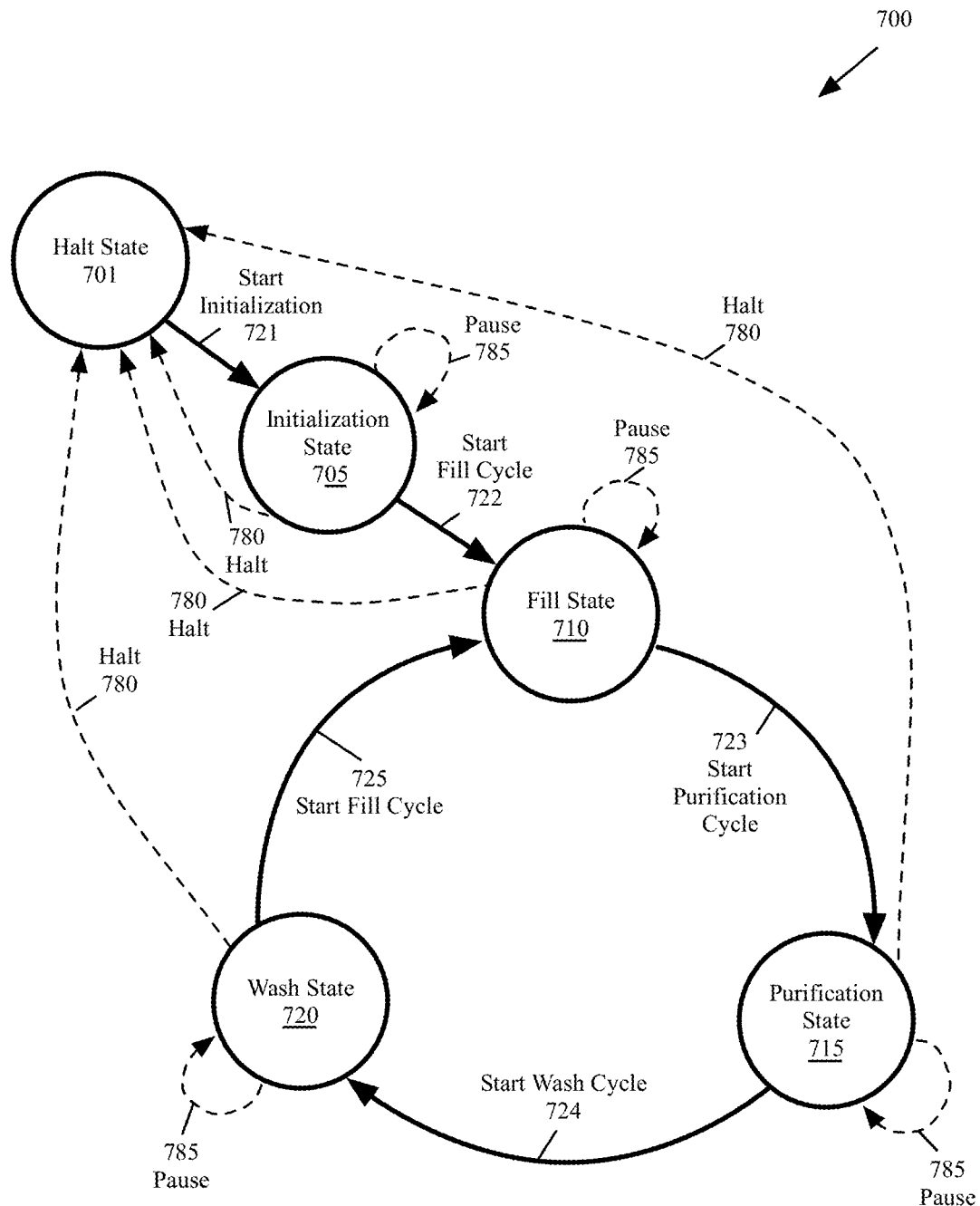
FIG. 7 is a state diagram for a modular water purification device, according to various aspects of the present disclosure.

FIG. 7 is a state diagram 700 for a modular water purification device, according to various aspects of the present disclosure. With reference to FIG. 7, from a halt state 701, the modular water purification device 100 (FIGS. 1A-1B) may go through an initialization state 705. After the initialization state 705, the modular water purification device 100 may go to the fill state 710, followed by the purification state 715, followed by the wash state 720. The modular water purification device 100 may repeatedly go through the fill 710, purification 715, and wash 720 states.

In some of the present embodiments, several modular water purification devices 100 may be connected to each other to form a cascade. The cascade, as described below with reference to FIG. 8, may include one or more rows. In some of the present embodiments, a cascade (or each row of a cascade) may include a controller that may receive measurements of different parameters (e.g., pre-purified water level, pre-purified water temperature, hot water vapor chamber temperature, etc.) of the modular water purification devices in the cascade (or a row of the cascade) and may determine the start of the end of each cycle 710-715 for the modular water purification devices.

With reference to FIG. 7, the state diagram 700 may be controlled by the controller 150 in each modular water purification device 100, by the row controller for all modular water purification devices in a cascade row, and/or by the cascade controller for all modular water purification devices in the cascade. In the halt state 701, the modular water purification device of some embodiments may turn off power to one or more components such as the Peltier device 140, the auxiliary heating element(s) 155, the fan 180, etc. In some embodiments, the valves 101-104 and 106 may be kept closed.

From the halt state 701, the modular water purification device 100 may receive a start initialization signal 721 (e.g., from the row controller, the cascade controller, or after the power is applied to the device) and may perform one or more initialization operations as described below with reference to FIGS. 10A-10B. After initialization, the modular water purification device 100 may receive a start fill cycle 722 signal (e.g., from the row controller or the cascade controller) to go to the fill state 710 to perform a fill cycle 710 and bring pre-purified water into the device. From the fill state 710, the modular water purification device 100 may receive a start purification cycle signal 723 (e.g., from the row controller or the cascade controller) to go to the purification state purify water.

From the purification state 715, the modular water purification device 100 may receive a start wash cycle signal 724 (e.g., from the row controller or the cascade controller) to go to the wash state 720 to wash salt and other sediments from the device. From the wash state 720, the modular water purification device 100 may receive a start fill cycle signal 725 (e.g., from the row controller or the cascade controller) to go back to the fill state 710. From any of the initialization 705, fill 710, purification 715, and wash 720 states, the modular water purification device 100 may receive a halt signal 780 and return to the halt state 701. From any of the initialization 705, fill 710, purification 715, and wash 720 states, the modular water purification device 100 may receive a pause signal 785 and may maintain the current state until another signal to change the state is received.

Figure 8:
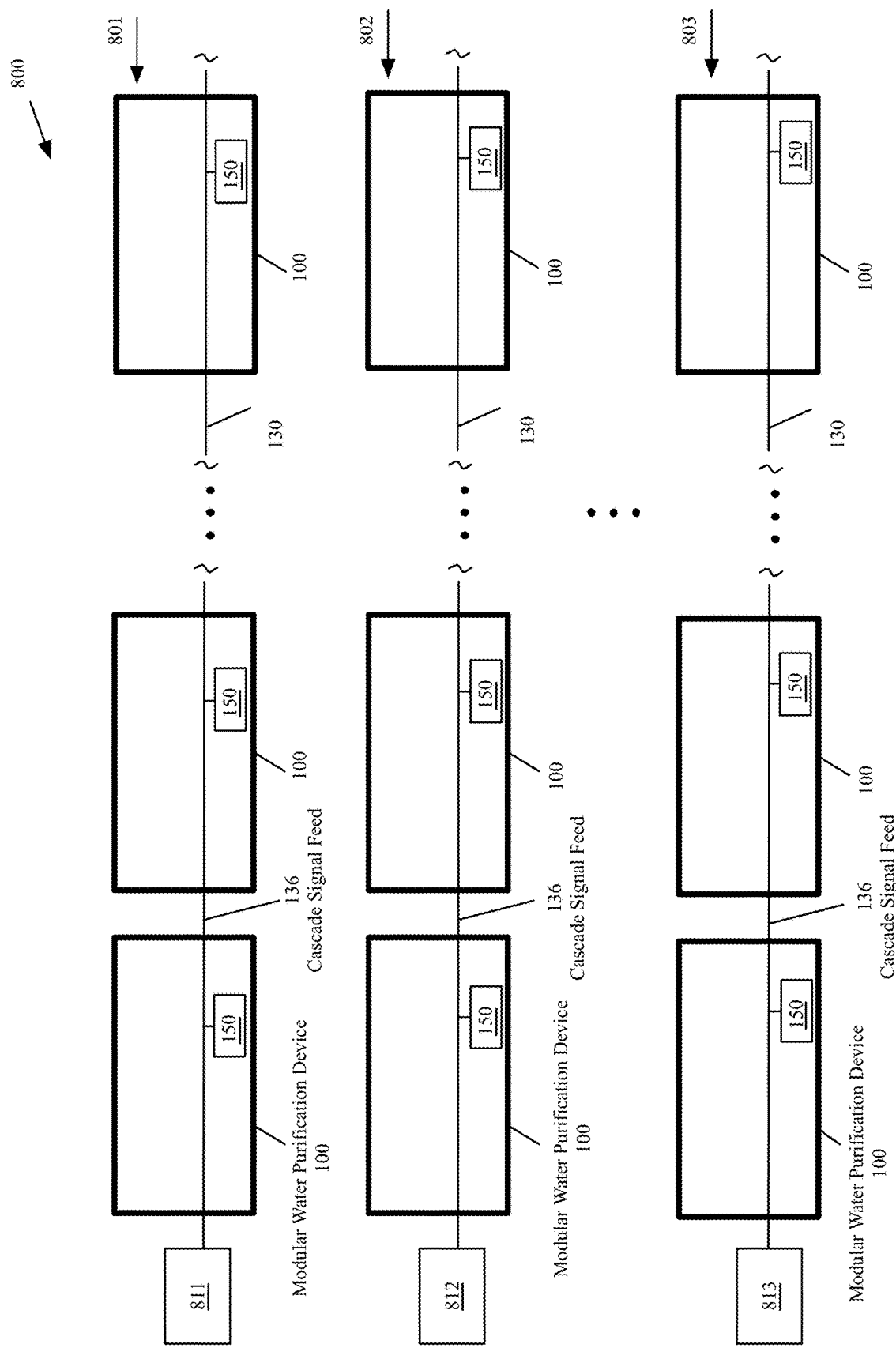
FIG. 8 is a functional block diagram of one example embodiment of a cascade of modular water purification devices that includes one or more rows of modular water purification devices, according to various aspects of the present disclosure.

FIG. 8 is a functional block diagram of one example embodiment of a cascade of modular water purification devices that includes one or more rows of modular water purification devices, according to various aspects of the present disclosure. With reference to FIG. 8, the cascade 800 may include one or more rows 801-803. Each row may include one or more modular water purification devices 100.

Each row 801-803 of the cascade 800 may have a corresponding controller 811-813. The controllers 811-813, in some embodiments, may communicate with each other through wired or wireless connections (not shown). The controllers 811-813 may receive measurements of different parameters (e.g., pre-purified water level, pre-purified water temperature, hot water vapor chamber temperature, pressure, etc.) and/or status data from the controllers 150 in the corresponding row. The controllers 811-813 may determine the start of the end of each cycle 710-715 (FIG. 7) for the modular water purification devices.

The controllers 811-813 may be (or may include) a processing unit such as a processor or microprocessor. The controllers 811-813 may include (or may be associated with) volatile memory and non-volatile storage. The controllers may send one or more signals to the controllers 150 in the corresponding rows to start or end each cycle.

Although the row controllers 811 are shown as external to the modular water purification devices 100, in some embodiments, one of the controllers 150 in each row may be configured to operate as the row controller. Some embodiment may only include one controller (e.g., the controller 811) for controlling every row of the cascade 800. In these embodiments, the cascade controller 811 may be connected to the cascade signal feed 136 of every row 801-803. In some embodiments, one of the controllers 150 may be configured to operate as the controller for every row of the cascade 800.

Figure 9A:
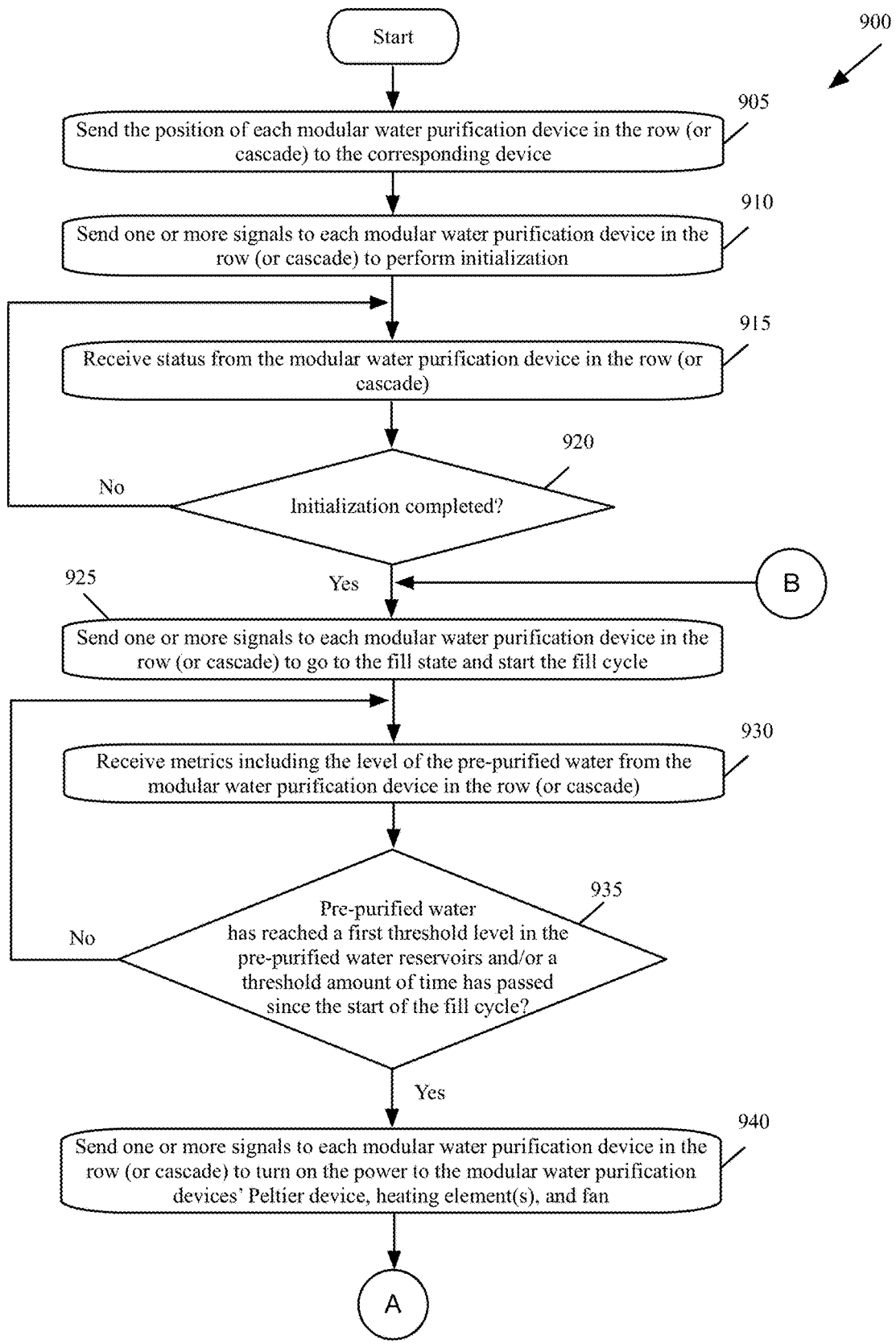
FIGS. 9A-9B are a flowchart illustrating an example process for purifying water by a cascade of modular water purification devices, according to various aspects of the present disclosure.
Figure 9B:
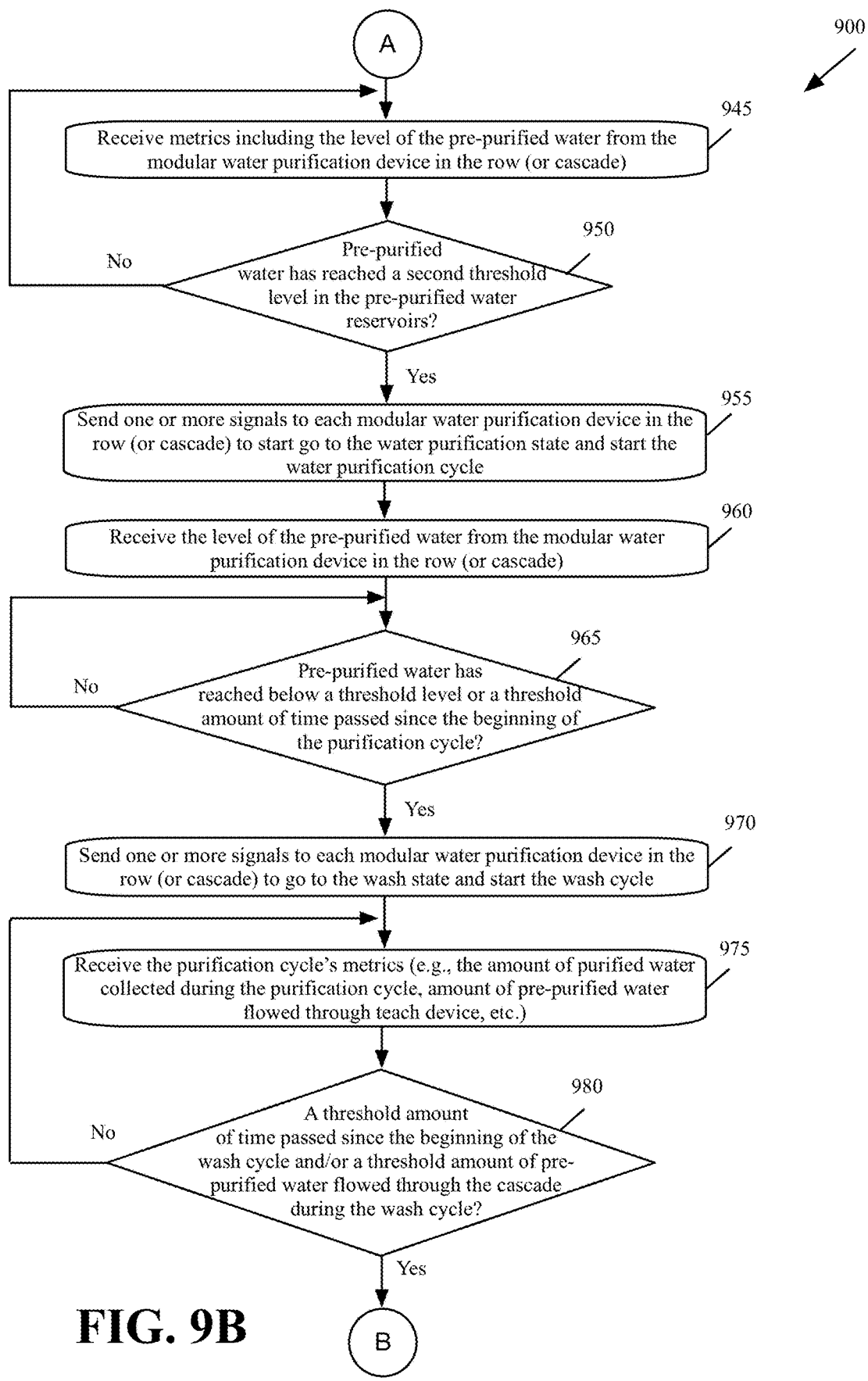

FIGS. 9A-9B are a flowchart illustrating an example process 900 for purifying water by a cascade of modular water purification devices, according to various aspects of the present disclosure. In some of the present embodiments, the process 900 may be performed by a controller 811-813 of FIG. 8 (or by a controller 150 of a modular water purification device 100 that is configured to operate as a cascade or a row controller).

With reference to FIGS. 9A-9B, the process 900 may send (at block 905) the position of each modular water purification device in the row (or cascade) to the corresponding device. In some of the present embodiments, each modular water purification device 100 may have a unique identification code that may be assigned to the device either at the manufacture time or at the deployment time. The unique identification code of each device 100 may be stored in non-volatile storage on the device.

The position of each device 100 in a row 801-803 may be stored (e.g., at the deployment time of the cascade 800) in non-volatile storage accessible to the controllers 811-813 of the rows 801-803 (or the controller of the cascade 800). The controller of each row 801-803 (or the controller of the cascade 800) may send (at block 905) the position of each device 100 in a row 801-803 of the cascade to the corresponding device 100. The controller 150 of each device may, therefore, may receive the information whether the corresponding device is the first device in a row, the last device in the row, or a device in a position other than the first or last device the row.

With further reference to FIGS. 9A-9B, the process 900 may send (at block 910) one or more signals to each modular water purification device 100 to perform initialization. The process 1000 (FIGS. 10A and 10B) describes the operations performed by each modular water purification device 100 in response to the signals received from the process 900.

The process 900 may then receive (at block 915) status (e.g., whether or not the initialization is completed) from each modular water purification device 100 in the row (or the cascade). The process 900 may then determine (at block 920) whether the initialization is completed by the modular water purification device 100 in the row (or the cascade). When the process 900 determines (at block 920) that the initialization is not completed, the process 900 may return to block 915, which was described above.

Otherwise, the process 900 may send (at block 925) one or more signals to each modular water purification device in the row (or cascade) to go to the fill state and start the fill cycle. During the fill cycle, the pre-purified water reservoir 120 (FIGS. 1A-1B) of modular water purification devices 100 may be filled by the pre-purified water.

With reference to FIGS. 9A-9B, the process 900 may receive (at block 930) metrics including the level of the pre-purified water from the modular water purification device in the row (or cascade). For example, the process 900 may receive the pre-purified water level from the sensor(s) 41 of FIGS. 1A-1B.

The process 900 may determine (at block 935) whether the pre-purified water has reached a first threshold level in the pre-purified water reservoirs and/or a threshold amount of time has passed since the start of the fill cycle. Some of the present embodiments may turn on the power to the modular water purification devices' Peltier device 140 (FIGS. 1A-1B) and the auxiliary heating element(s) 155 prior to the completion of the fill cycle in order to heat the Peltier device 140 and the auxiliary heating element(s) 155. Some embodiments may turn on the power to the fan 180 prior to the completion of the fill cycle in order to avoid any turbulence in the water vapor channel 116.

With reference to FIGS. 9A-9B, when the process 900 determines (at block 935) that the pre-purified water has not reached the first threshold level in the pre-purified water reservoirs, the process 900 may proceed to block 930, which was described above. Otherwise, the process 900 may send (at block 940) one or more signals to each modular water purification device in the row (or cascade) to turn on the power to the modular water purification devices' Peltier device 140, the auxiliary heating element(s) 155, and the fan 180. In some embodiments, a first threshold level of the pre-purified water in the pre-purified water reservoir 120 may be used to turn on the power to the Peltier device 140, the auxiliary heating element(s) 155, and the fan 180 and a second (and higher) threshold level of the pre-purified water in the pre-purified water reservoir 120 may be used to close the pre-purified input and output valves to start the water purification cycle.

In some embodiments, instead of the first threshold level, a timeout since the start of the fill cycle may be used (e.g., when the metrics received in block 935 includes the flow of the pre-purified water into the pre-purified water reservoir 120) to turn on the power to the Peltier device 140, the auxiliary heating element(s) 155, and the fan 180.

With continued reference to FIGS. 9A-9B, the process 900 may then receive (at block 945) metrics including the level of the pre-purified water from the modular water purification device in the row (or cascade). The process 900 may then determine (at block 950) whether the pre-purified water has reached a second threshold level in the pre-purified water reservoirs. When the process 900 determines (at block 950) that the pre-purified water has not reached the second threshold level in the pre-purified water reservoirs, the process 900 may proceed to block 945, which was described above. Otherwise, the process 900 may send (at block 955) one or more signals to each modular water purification device in the row (or cascade) to go to the water purification state and start the water purification cycle.

The process 900 may then receive (at block 960) the level of the pre-purified water from the modular water purification device in the row (or cascade). As the pre-purified water is evaporated from the pre-purified water reservoir 120, the level of pre-purified water in the pre-purified reservoir 120 may drop. The level of pre-purified water in the pre-purified reservoir 120 may, therefore, be used as an indication that not much pre-purified water is left in the pre-purified water reservoir 120 and the water purification cycle may be ended.

The process 900 may then determine (at block 965) whether the pre-purified water has reached below a threshold level or a threshold amount of time passed since the beginning of the purification cycle. When the process 900 determines (at block 965) that the pre-purified water has not reached below a threshold level or a threshold amount of time has not passed since the beginning of the purification cycle, the process 900 may proceed to block 960, which was described above.

Otherwise, the process 900 may send (at block 970) one or more signals to each modular water purification device in the row (or cascade) to go to the wash state and start the wash cycle. During the wash cycle the pre-purified water is passed through the cascade in order to wash the salt and/or other sediments that are accumulated on the auxiliary heating element(s) 155 (or on the hot side 143 of the Peltier device 140 if the device does not include an auxiliary heating element(s) 155).

The process 900 may then receive (at block 975) the purification cycle's metrics (e.g., the amount of purified water collected during the purification cycle, amount of pre-purified water flowed through teach device, etc.). The process 900 may then determine (at block 980) whether a threshold amount of time has passed since the beginning of the wash cycle and/or a threshold amount of pre-purified water flowed through the cascade during the wash cycle.

When the process 900 determines (at block 980) that a threshold amount of time has not passed since the beginning of the wash cycle and/or a threshold amount of pre-purified water has not flowed through the cascade during the wash cycle, the process 900 may proceed to block 975, which was described above. Otherwise, the process 900 may proceed to block 925 to start a new fill cycle.

Figure 10A:
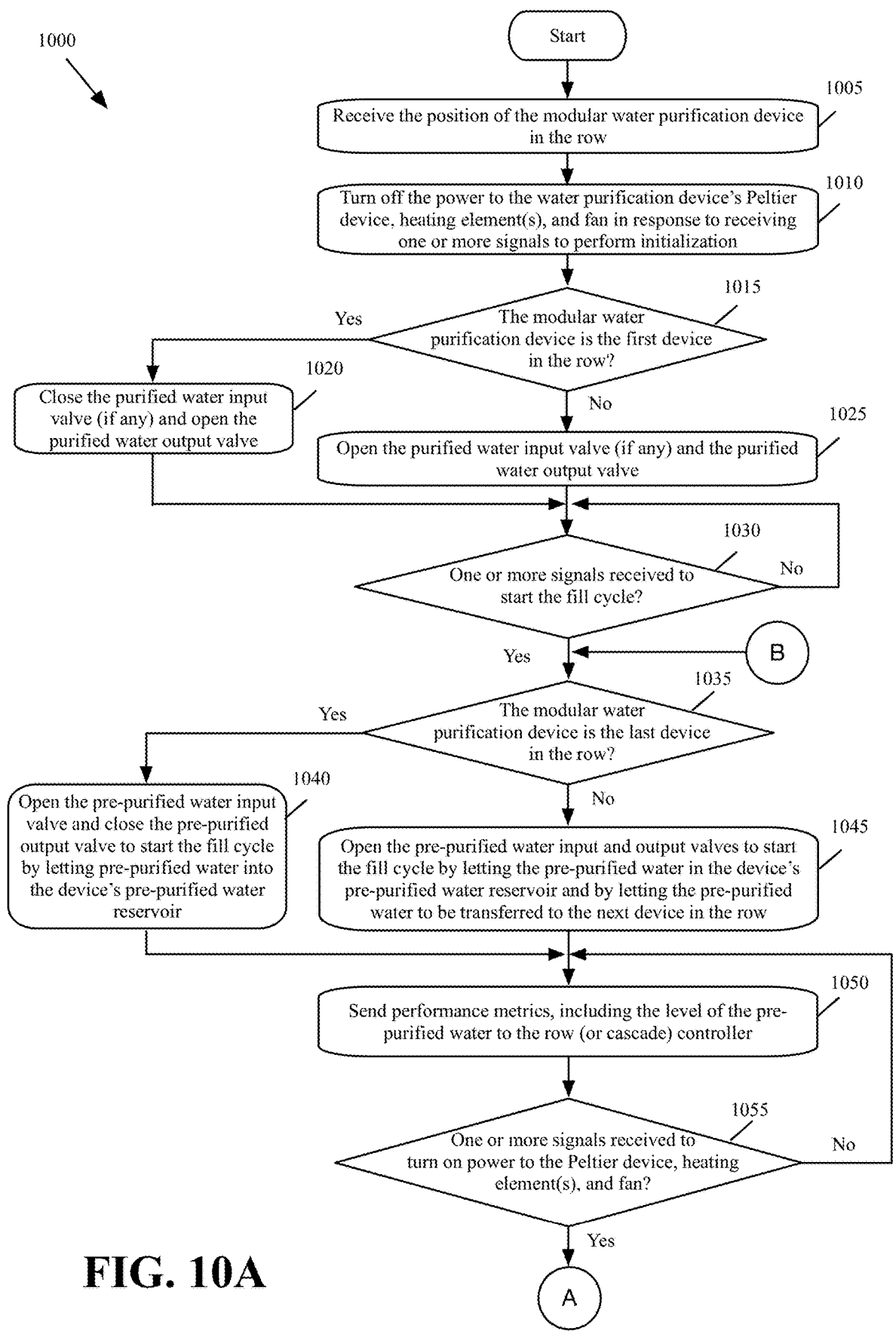
FIGS. 10A and 10B are a flowchart illustrating an example process for purifying water by a cascade of modular water purification devices, according to various aspects of the present disclosure.
Figure 10B:
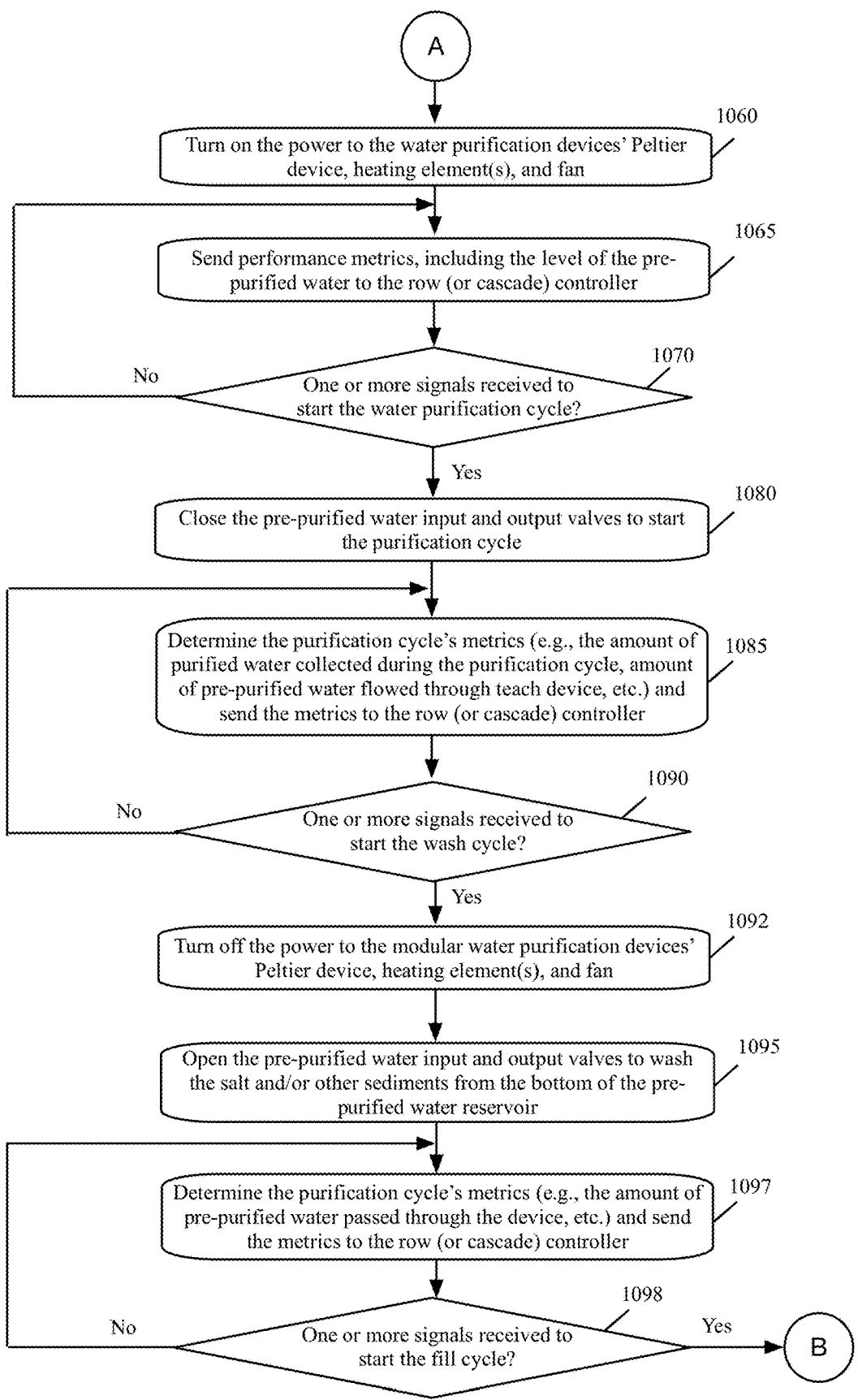

FIGS. 10A and 10B are a flowchart illustrating an example process 1000 for purifying water by a modular water purification device, according to various aspects of the present disclosure. In some of the present embodiments, the process 1000 may be performed by the controller 150 (FIGS. 1A-1B). The process 1000, in some embodiments, may communicate with the process 900. For example, the process 1000 may receive signals from the process 900 to start different cycles. The process 1000 may send status data and metrics to the process 900.

With reference to FIGS. 10A and 10B, the process 1000 may receive (at block 1005) the position of the module water purification device in a row of the water purification cascade. For example, the controller 150 (FIG. 8) of a modular water purification device 100 in cascade 800 may receive the position of the device 100 in a row 811-803 of the cascade 800. For example, the controller 150 may receive information whether or not the device 100 is the first or the last device in a row.

The process 1000 may turn off (at block 1010) the power to the water purification device's Peltier device, the auxiliary heating element(s), and the fan in response to receiving one or more signals to perform initialization. For example, the controller 150 (FIGS. 1A-1B) may turn off the power to the water purification device's Peltier device 140, the auxiliary heating element(s) 155, and the fan 180 in response to the process 900 (FIG. 9) sending the initialization signal(s) at block 910.

With further reference to FIGS. 10A and 10B, the process 1000 may determine (at block 1015) whether the modular water purification device is the first device in the row. In the embodiments that transfer the purified water through the cascade (e.g., the embodiment of FIGS. 1A and 2), when the process 1000 determines (at block 1015) that the modular water purification device is the first device in the row (e.g., based on the information received at block 1005), the process 1000 may close (at block 1020) the purified water input valve 103 and may open (at block 1020) the purified water output valve 104. In the embodiments that transfer the purified water from each modular water purification device to one or more external reservoirs (e.g., the embodiment of FIGS. 1B and 3), when the process 1000 determines (at block 1015) that the modular water purification device is the first device in the row (e.g., based on the information received at block 1005), the process 1000 may open (at block 1020) the purified water output valve 106. The process 1000 may then proceed to block 1030, which is described below.

In the embodiments that transfer the purified water through the cascade (e.g., the embodiment of FIGS. 1A and 2), when the process 1000 determines (at block 1015) that the modular water purification device is not the first device in the row (e.g., based on the information received at block 1005), the process 1000 may open (at block 1025) the purified water input valve 103 and the purified output valve 104. In the embodiments that transfer the purified water from each modular water purification device to one or more external reservoirs (e.g., the embodiment of FIGS. 1B and 3), when the process 1000 determines (at block 1015) that the modular water purification device is not the first device in the row (e.g., based on the information received at block 1005), the process 1000 may open the purified water output valve 106.

The process 1000 may then determine (at block 1030) whether one or more signals are received (e.g., from block 925 of the process 900) to go to the fill state and start the fill cycle. When the process 1000 determines (at block 1030) that one or more signals are not received to start the fill cycle, the process 1000 may proceed to block 1030, which was described above. Otherwise, the process 1000 may determine (at block 1035) whether the modular water purification device is the last device in the row.

When the process 1000 determines (at block 1035) that the modular water purification device is the last device in the row (e.g., based on the information received at block 1005), the process 1000 may open (at block 1040) the pre-purified water input valve 101 (FIGS. 1A-1B) and may close (at block 1040) the pre-purified water output valve 102 to start the fill cycle by letting the pre-purified water into the pre-purified water reservoir 120. The process 1000 may then proceed to block 1050, which is described below. When the process 1000 determines (at block 1035) that the modular water purification device is not the last device in the row (e.g., based on the information received at block 1005), the process 1000 may open (at block 1045) the pre-purified water input valve 101 (FIGS. 1A-1B) and may open (at block 1045) the pre-purified water output valve 102 to start the fill cycle by letting the pre-purified water into the pre-purified water reservoir 120 and by letting the pre-purified water to be transferred to the next modular water purification device in the row.

The process 1000 may then send (at block 1050) performance metrics, including the level of the pre-purified water to the row (or cascade) controller. As described above with reference to block 935 (FIG. 9A), the process 900 may use the level of the pre-purified water to determine whether the power to the Peltier device, the auxiliary heating element(s), and the fan may be turned on.

With further reference to FIGS. 10A and 10B, the process 1000 may determine (at block 1055) whether one or more signals are received to turn on the power to the Peltier device, the auxiliary heating element(s), and the fan. For example, the process 1000 may receive the one or more signals to turn on the power to the Peltier device when the pre-purified water reaches a first threshold in the pre-purified water reservoir and/or a threshold amount of time is passed since the start of the fill cycle.

When the process 1000 determines (at block 1055) that one or more signals are received to turn on the power to the Peltier device, the auxiliary heating element(s), and the fan are not received, the process 1000 may proceed to block 1050, which was described above. Otherwise, the process 1000 may turn on (at block 1060) the power to the Peltier device 140 (FIGS. 1A-1B), the auxiliary heating element(s) 155, and the fan 180.

The process 1000 may then send (at block 1065) performance metrics, including the level of the pre-purified water to the row (or cascade) controller. As described above with reference to block 950 (FIG. 9B), the process 900 may use the level of the pre-purified water to determine whether the water purification cycle may be started.

With further reference to FIGS. 10A and 10B, the process 1000 may determine (at block 1070) whether one or more signals are received to go to the water purification state and start the water purification cycle. If not, the process 1000 may proceed to block 1065, which was described above. Otherwise, the process 1000 may close (at block 1080) the pre-purified water input and output valves to start the purification cycle. For example, the controller 150 may close the valves 101 and 102 (FIGS. 1A-1B) to start the purification cycle.

The process 1000 may then determine (at block 1085) the purification cycle's metrics (e.g., the amount of purified water collected during the purification cycle, amount of pre-purified water flowed through teach device, etc.) and may send the metrics to the row (or cascade) controller. The process 1000 may then determine (at block 1090) whether one or more signals are received to go to the wash state and start the wash cycle. If not, the process 1000 may proceed to block 1085, which was described above. Otherwise, the process 1000 may turn off (at block 1092) the power to the modular water purification devices' Peltier device, auxiliary heating element(s), and fan.

The process 1000 may open (at block 1095) the pre-purified water input valve 101 and the pre-purified water output valve 102 to wash the salt and/or other sediments from the bottom of the pre-purified water reservoir. The process 1000 may determine (at block 1097) the purification cycle's metrics (e.g., the amount of pre-purified water passed through the device, etc.) and may send the metrics to the row (or cascade) controller.

The process 1000 may then determine (at block 1098) whether one or more signals are received to go to the fill state and start the fill cycle. If not, the process 1000 may proceed to block 1097, which was described above. Otherwise, the process 1000 may proceed to block 1035, which was described above to start a new fill cycle.

Figure 11:
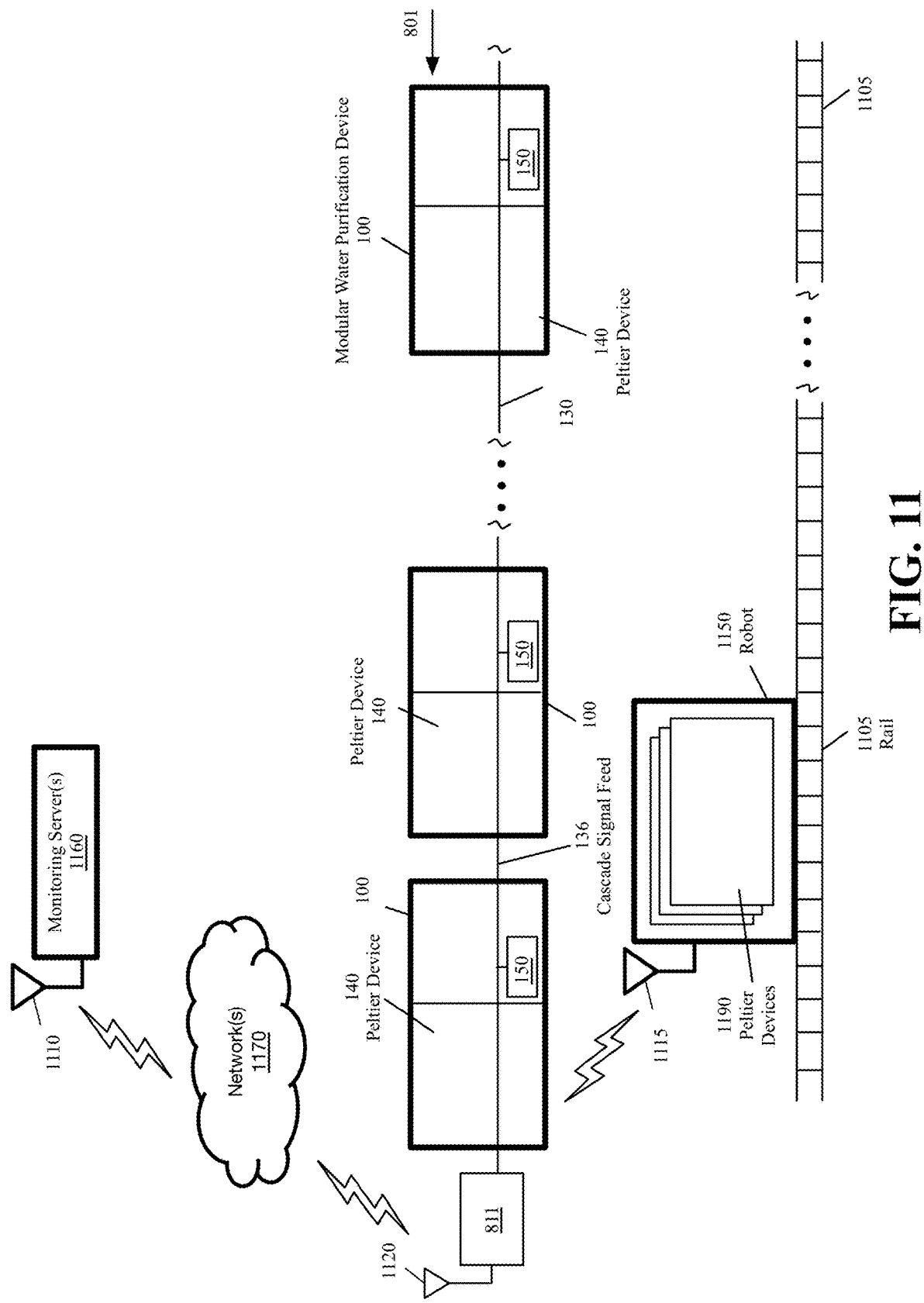
FIG. 11 is a functional block diagram of one example embodiment of a cascade of modular water purification devices with one or more monitoring servers and a robot for replacing Peltier devices, according to various aspects of the present disclosure.

In some of the present embodiments, the controller 150 in each modular water purification device 100 may send status data and performance metrics to one or more external electronic devices and/or may receive signals from one or more external electronic devices. FIG. 11 is a functional block diagram of one example embodiment of a cascade of modular water purification devices with one or more monitoring servers and a robot for replacing Peltier devices, according to various aspects of the present disclosure. For simplicity only one row of the cascade is shown.

With reference to FIG. 11, the controllers 150 may communicate data and status with the row controller 811 through the cascade signal feed 136. The row controller 811 may communicate wirelessly with one or more monitoring servers 1160 through one or more networks 1170. In some embodiments, the row controller 811 may include one or more antennas 1120 and the server(s) 1160 may include one or more antennas 1110 and may wirelessly communicate with each other (e.g., through one or more networks 1170). In some embodiments, the row controller 811 and the monitoring server(s) 1160 may communicate through a wired link.

The monitoring server(s) 1160 may generate reports, may provide one or more user interfaces to display the status and the performance metrics of the cascade 801. Each controller 150 may receive health, performance, and/or status information from different components of the corresponding modular water purification device 100. For example, the controller 150 may receive health, performance, and/or status information from the valves 101-104 and 106 (FIGS. 1A-1B, 2, and 3), the water level sensors 121 and 305, the humidity sensors 122, the temperature sensors 123, the Peltier device 140, the auxiliary heating element(s) 155, and the fan 180.

The controller 150 may send the health, performance, and/or status information to the row controller 811 through the cascade signal feed 136. The row controller 811 may send the health, performance, and/or status information to the server(s) 1160 through the wired and/or wireless links.

The controller 150, in some embodiments, may determine the health status of the Peltier device when the Peltier device is turned on. The controller 150, in some embodiments, may compare the current drawn by the Peltier device with a current range and may determine that the Peltier device has failed if the current drawn by the Peltier device is outside the range. The current range may depend on the size of the Peltier device. The controller 150, for example and without limitation, may receive the current range at the initialization state, at the configuration time of the modular water purification device, etc., and may store the current range in non-volatile memory inside the modular water purification device.

The controller 150, in some embodiments, may determine the health status of the Peltier device by comparing the temperature of the cold side of the Peltier device with a threshold temperature a threshold time period after the Peltier device is turned on. If the temperature of the cold side of the Peltier device is not lower than the threshold temperature within the threshold time period, the controller 150 may determine that the Peltier device has failed.

When the Peltier device 120 in a modular water purification device fails, the row controller 811 and/or the monitoring server(s) 1160 may send a signal to a robot 1150 to replace the failed Peltier device 140. The robot 1150 may include one or more antennas 1115 and may wirelessly communicate with the row controller 811 and/or the monitoring server(s) 1160 (e.g., through the network(s) 1170). The robot 1150 may communicate with the row controller 811 and/or the monitoring server(s) 1160 through a wired link.

As described with reference to FIGS. 6A-6B, the Peltier device 140 may be connected to a handle 605 that may allow the easy removal and insertion of the Peltier device into the frame 105. In some of the present embodiments, a portion of the frame may be detachable (e.g., the portion on side 503 that is directly under the insulator 185) to allow the handle to be used by the robot 1150 to remove the Peltier device and the detachable portion of the frame and insert another Peltier device that is connected to a handle and a similar detachable portion of the frame.

For example, the robot may include one or more arms (not shown). The robot 1150 may receive (e.g., from the row controller 811 and/or the monitoring server(s) 1160) the location of the modular water purification device 100 with a faulty Peltier device. The robot 1150 may move (e.g., over a rail 1105) to the modular water purification device 100 and may use its arm(s) to grab the handle 605 and remove the faulty Peltier device 90. The robot 1150 may have access to one or more functional Peltier devices 1190. The robot 1150 may use its arm(s) to grab the handle 605 of a functional Peltier devices 1190 and insert it in place of the faulty Peltier device 90.

Figure 12:
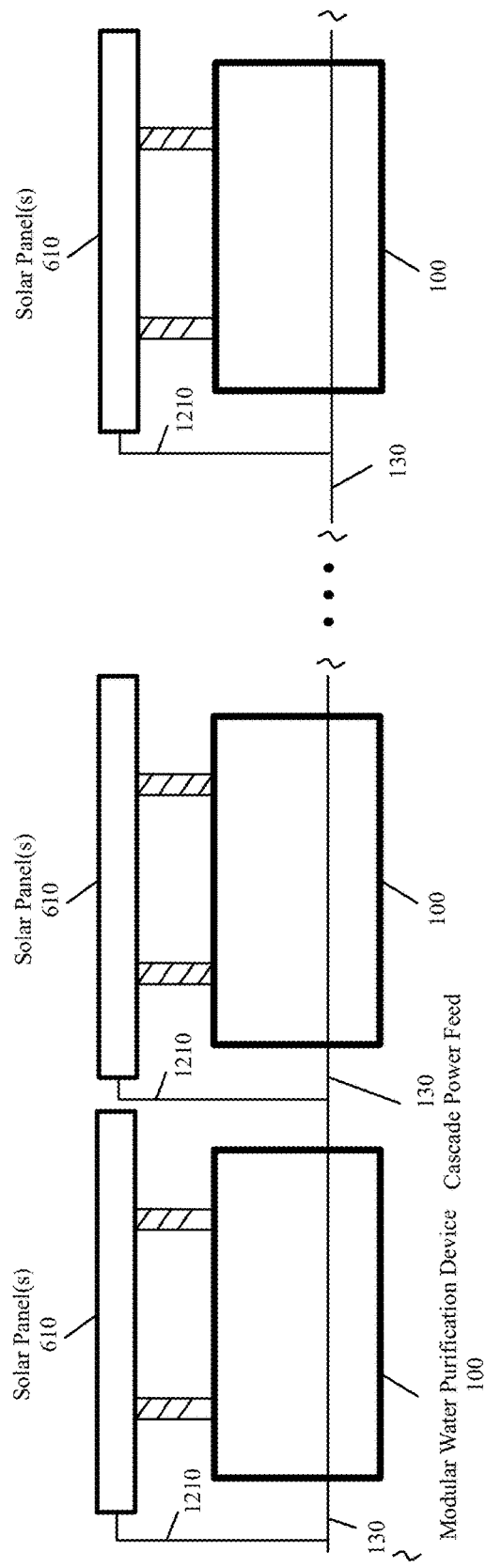
FIG. 12 is a front elevational view of one example embodiment of a cascade of modular water purification devices that receives electricity from solar panels associated with one or more of the modular water purification devices, according to various aspects of the present disclosure.

The water purification cascade in different embodiments may receive power from different sources. FIG. 12 is a front elevational view of one example embodiment of a cascade of modular water purification devices that receives electricity from solar panels associated with one or more of the modular water purification devices, according to various aspects of the present disclosure.

As described with reference to FIGS. 6A-6B, the modular water purification device 100 may include one or more solar panels 610. The solar panels 610 may generate power and may provide power to the cascade's power feed 130 through a power feed 1210. A portion of the generated power may be stored (e.g., in one or more capacitors) for use when solar or ambient lights are not available.

Figure 13:
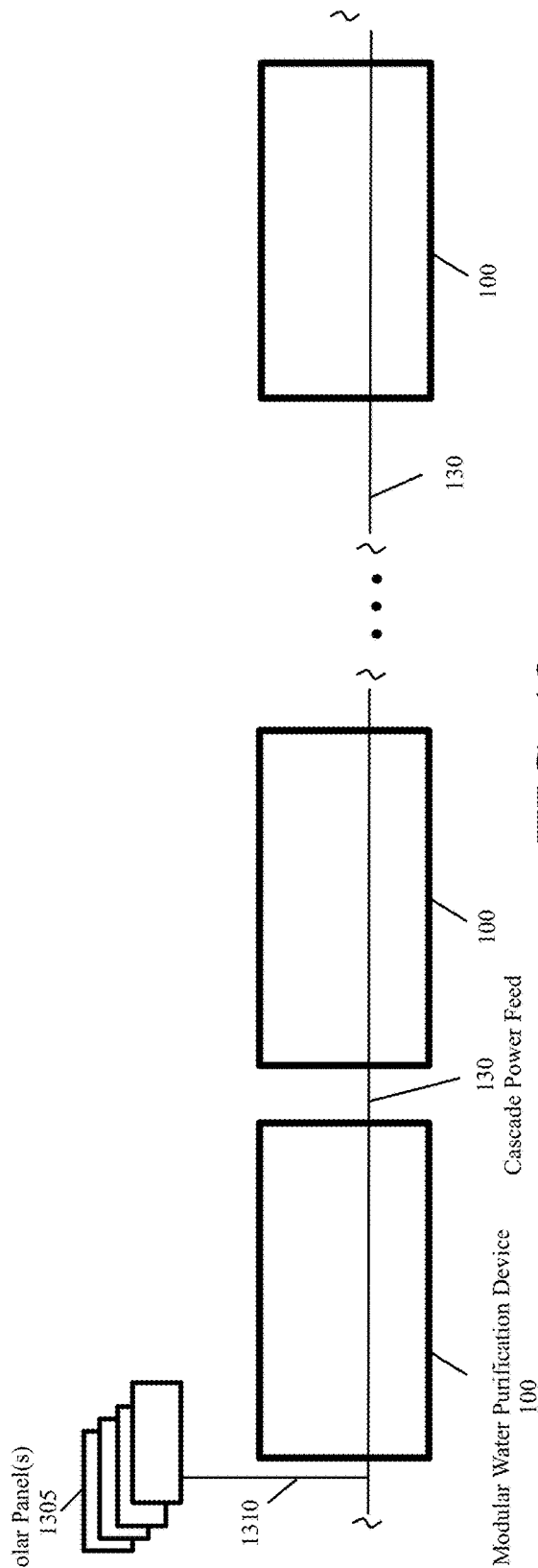
FIG. 13 is a front elevational view of one example embodiment of a cascade of modular water purification devices that receives electricity from one or more solar panels, according to various aspects of the present disclosure.

FIG. 13 is a front elevational view of one example embodiment of a cascade of modular water purification devices that receives electricity from one or more solar panels, according to various aspects of the present disclosure. With reference to FIG. 13, the cascade may include a set of solar panels 1305 that are separate from the modular water purification devices 100. The solar panels 1305 may generate power and may provide power to the cascade's power feed 130 through a power feed 1310. A portion of the generated power may be stored (e.g., in one or more capacitors) for use when solar or ambient lights are not available.

Figure 14:
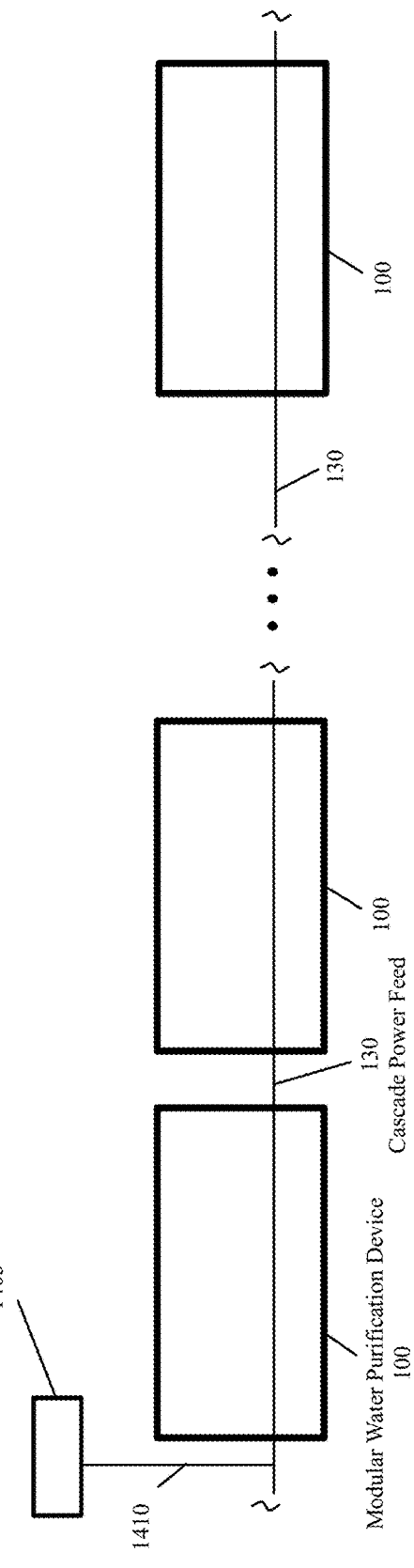
FIG. 14 is a front elevational view of one example embodiment of a cascade of modular water purification devices and different sources of energy that may be used by the cascade, according to various aspects of the present disclosure.

FIG. 14 is a front elevational view of one example embodiment of a cascade of modular water purification devices and different sources of energy that may be used by the cascade, according to various aspects of the present disclosure. With reference to FIG. 14, the power generator 1405 may generate power from one or more sources of energy such as, without limitation, thermal, wind, marine, hydroelectric, osmosis, biomass, etc. The power generated by the power generator 1405 may be connected to the cascade power feed 130 through a power feed 1410.

Figure 15:
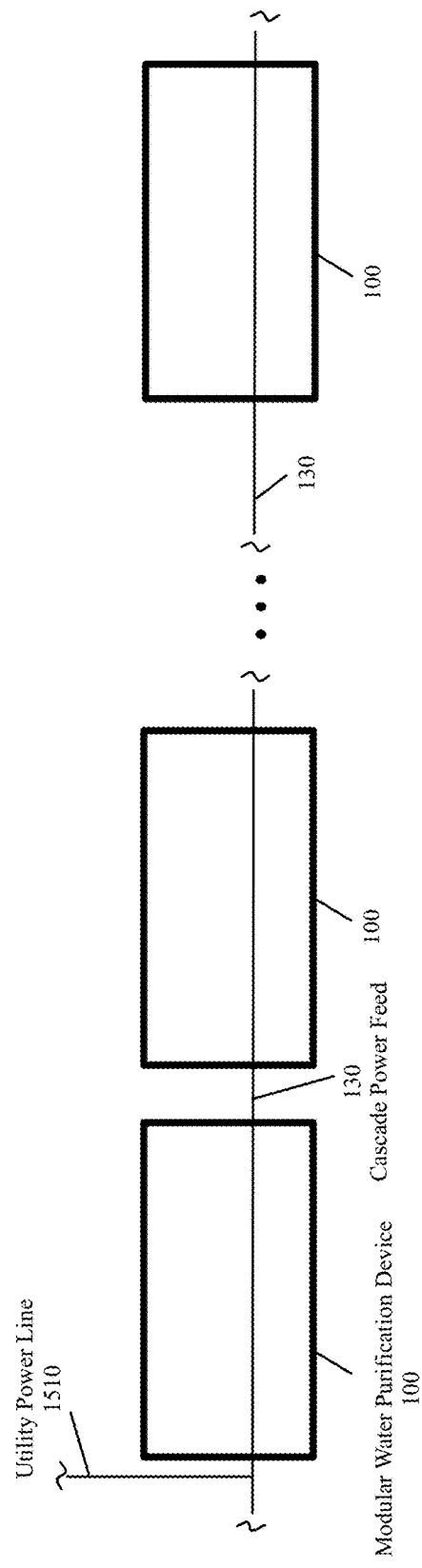
FIG. 15 is a front elevational view of one example embodiment of a cascade of modular water purification devices that receives energy from a utility power line, according to various aspects of the present disclosure.

FIG. 15 is a front elevational view of one example embodiment of a cascade of modular water purification devices that receives energy from a utility power line, according to various aspects of the present disclosure. With reference to FIG. 15, the utility power line 1510 may come from a municipal or industrial utility power line. The cascades in FIGS. 12-13 may use any of the power source described with reference to FIGS. 14-15 in addition to using the power generated by the solar panels.

As described above with reference to FIG. 8, a cascade 800 may include one or more rows 801-803 and each row may include one or more modular water purification devices 100. In the embodiments that have one row with one modular water purification device, the single modular water purification device may be used as a standalone water purification device.

Figure 16:
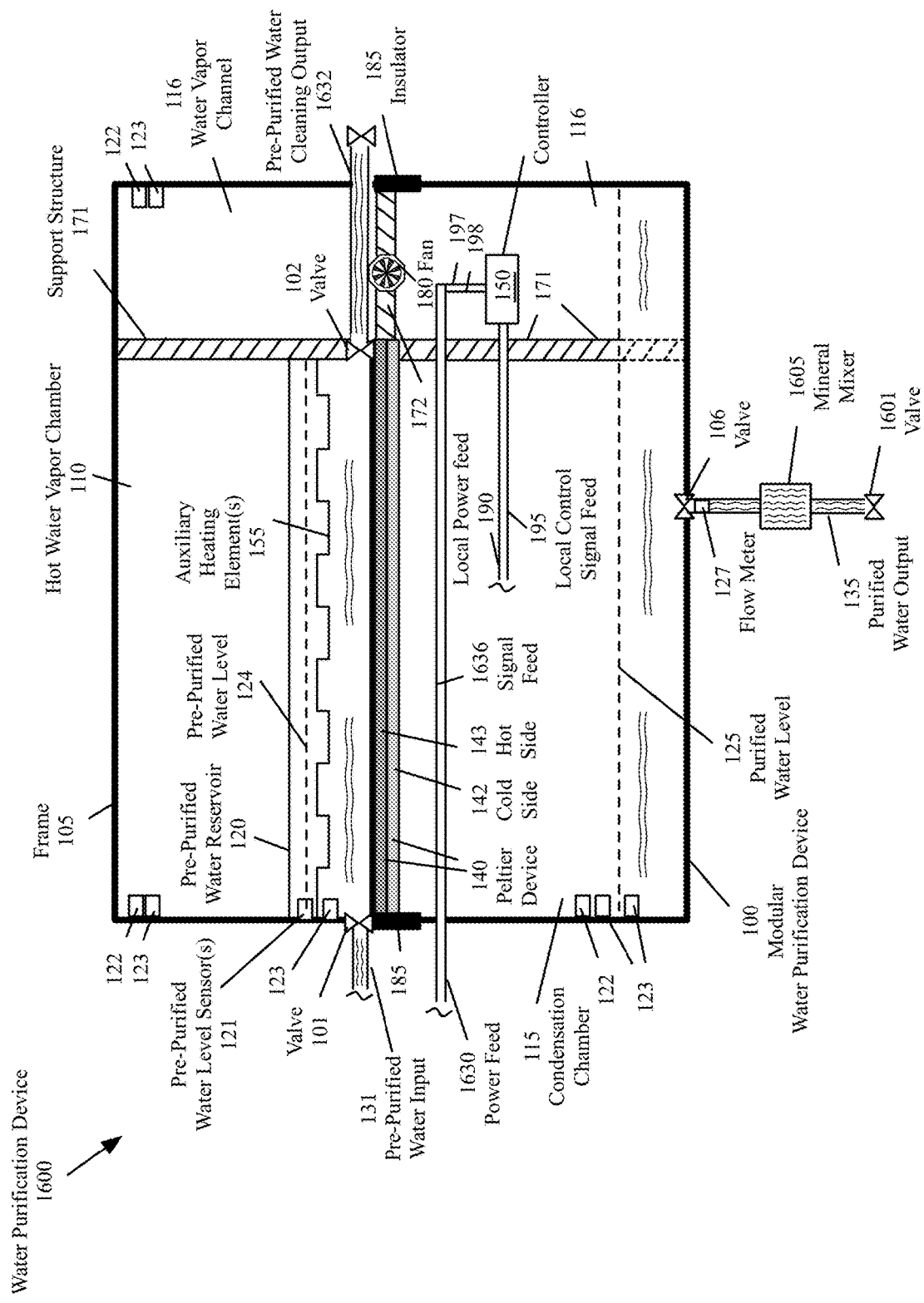
FIG. 16 is a front elevational view of one example embodiment a single modular water purification device used as a standalone water purification device, according to various aspects of the present disclosure.

FIG. 16 is a front elevational view of one example embodiment a single modular water purification device used as a standalone water purification device, according to various aspects of the present disclosure. With reference to FIG. 16, the water purification device 1600 may include only one modular water purification device 100. The water purification device 1600 may be used as a portable device or may be anchored, for example, to a platform.

Similar to the modular water purification devices described above, the modular water purification device 100 of FIG. 16 go through the states 701, 705, 710, 175, and 720, as described above with reference to FIG. 7. For example, the modular water purification device 100 of FIG. 16 may repeatedly go through a fill cycle, followed by a water purification cycle, followed by a wash cycle. During the fill cycle, the pre-purified water reservoir 120 may be filled with pre-purified water. During the water purification cycle, the pre-purified water may be vaporized and condensed into purified water. The purified water may be transferred out of the water purification device 1600.

The valve 101 may bring pre-purified water through the pre-purified water input pipe (or channel) 131. Examples of the pre-purified water include, without any limitations, tap water that may require purification, salt water from the oceans, salt water from lakes, brackish water from estuaries and aquifers, brine from the Earth's surface and crust, fresh water from rivers, lakes, well, etc.

The purified water that is collected at the bottom of the frame 105 may be transferred out of the water purification device 1600 through the valve 106 and the purified water output channel 135. Some embodiments may include a mineral mixer 1605 on the purified water output 135 to add minerals to the purified water. The mineral mixer 1605 may be, for example, and without limitations, a remineralization filter. The mineral mixer 1605 may add different mineral, such as, for example, and without limitations, compound of calcium, magnesium, potassium, etc.

In addition to, or in lieu of, the valve 106, some embodiments may include another valve 1601 after the mineral mixer 1605. Although only one valve 106 and one purified water output channel 135 are shown in FIG. 16, the water purification device 1600, in some embodiments, may have several purified water output channels and the corresponding valves for transferring the purified water out of the device.

With further reference to FIG. 16, the valve 1632 may take the pre-purified water out of the water purification device 1600 during the wash cycle. The water purification device 1600 may receive power from a power feed 1630. Similar to the embodiments described above, the modular water purification device 100 of FIG. 16 may receive power from one or more sources such as, for example, and without limitations, a utility power line coming from a municipal or industrial utility power line utility power line may come from a municipal or industrial utility power line (e.g., as described above with reference to FIG. 15), one or more solar panels associated with one or more of the modular water purification devices (e.g., as described above with reference to FIGS. 6C-6F and 12), from one or more solar panels that are separate from the modular water purification devices 100 (e.g., as described above with reference to FIG. 13), from one or more sources of energy such as, without limitation, thermal, wind, marine, hydroelectric, osmosis, biomass, etc. (e.g., as described above with reference to FIG. 14).

In some embodiments, the controller 150 may receive the power feed 1630 and may distributed the power to other components of the modular water purification device 100 through the local power feed 190. In some embodiments, the controller 150 may receive the signal feed 1636 and may send control signals to other components of the modular water purification device 100 through the local control signal feed 195. Other components of the modular water purification device 100 of FIG. 16 may be similar to the corresponding components of the water purification device 100 of FIGS. 1A and 1B.

Some of the above-described features and applications may be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which may be read into memory for processing by a processor. Also, in some embodiments, multiple software inventions may be implemented as sub-parts of a larger program while remaining distinct software inventions. In some embodiments, multiple software inventions may also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 17:
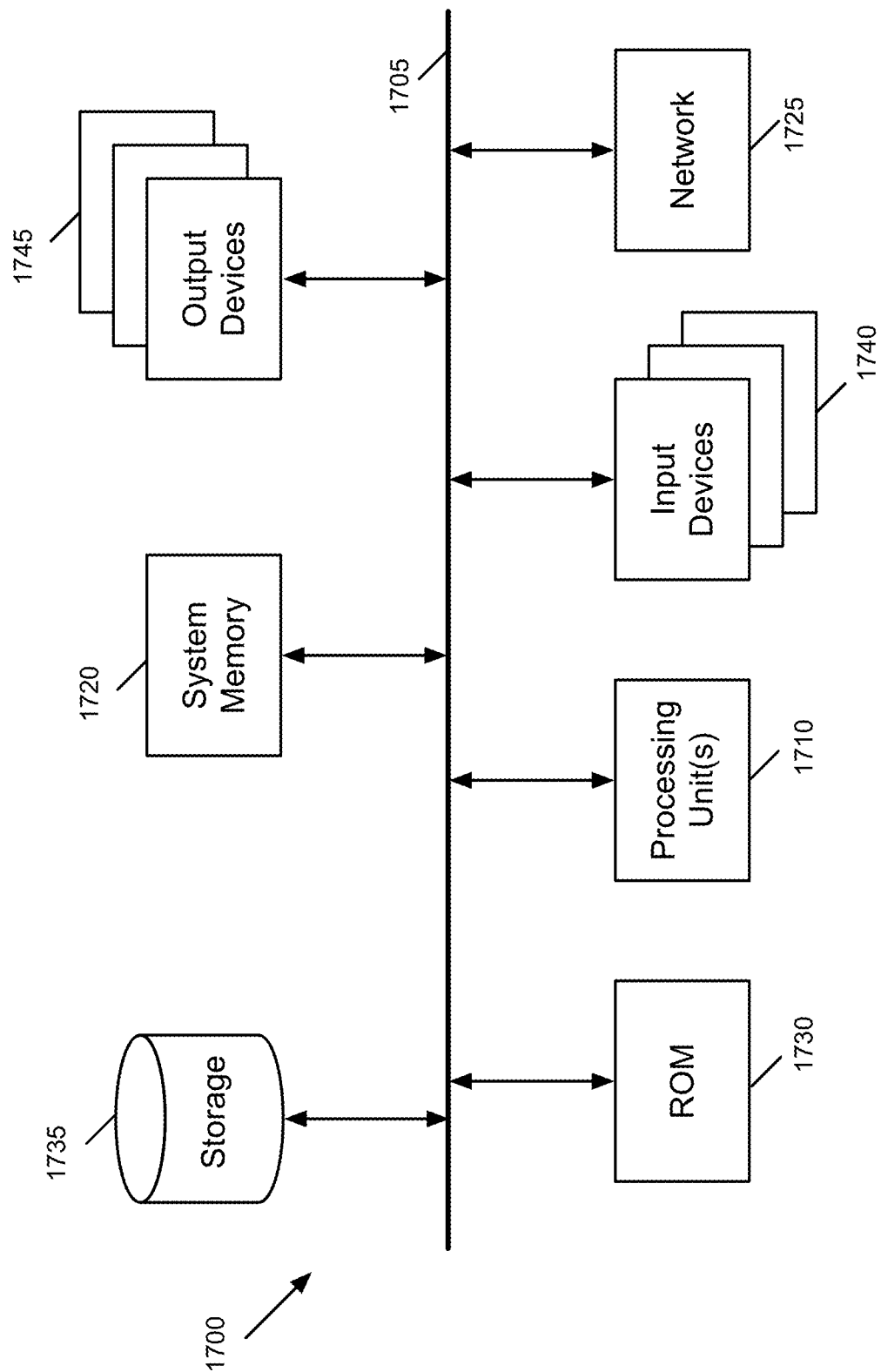
FIG. 17 is a functional block diagram of one example embodiment of an electronic system with which some embodiments of the invention are implemented.

FIG. 17 is a functional block diagram of one example embodiment of an electronic system 1700 with which some embodiments of the invention (e.g., the controllers, the processing units, the robots, the servers, etc.) are implemented. The electronic system 1700 may be used to execute any of the control, virtualization, and/or operating system applications described above. The electronic system 1700 may be a computer (e.g., desktop computer, personal computer, tablet computer, server computer, mainframe, blade computer etc.), a controller, a microcontroller, or any other sort of electronic device. Such an electronic system includes various types of computer readable media and interfaces for various other types of computer readable media. Electronic system 1700 includes a bus 1705, processing unit(s) 1710, a system memory 1720, a read-only memory (ROM) 1730, a permanent storage device 1735, input devices 1740, and output devices 1745.

The bus 1705 may collectively represent all system, peripheral, and chipset buses that communicatively connect the numerous internal devices of the electronic system 1700. For example, the bus 1705 may communicatively connect the processing unit(s) 1710 with the read-only memory 1730, the system memory 1720, and the permanent storage device 1735.

From these various memory units, the processing unit(s) 1710 may retrieve instructions to execute and data to process in order to execute the processes of the invention. The processing unit(s) may be a single processor or a multi-core processor in different embodiments.

The read-only-memory 1730 may store static data and instructions that are needed by the processing unit(s) 1710 and other modules of the electronic system. The permanent storage device 1735, on the other hand, may be a read-and-write memory device. This device is a non-volatile memory unit that stores instructions and data even when the electronic system 1700 is off. Some embodiments of the invention use a mass-storage device (such as a magnetic or optical disk and its corresponding disk drive) as the permanent storage device 1735.

Other embodiments may use a removable storage device (such as a floppy disk, flash drive, etc.) as the permanent storage device. Like the permanent storage device 1735, the system memory 1720 may be a read-and-write memory device. However, unlike storage device 1735, the system memory may be a volatile read-and-write memory, such as random access memory. The system memory may store some of the instructions and data that the processor needs at runtime. In some embodiments, the invention's processes may be stored in the system memory 1720, the permanent storage device 1735, and/or the read-only memory 1730. From these various memory units, the processing unit(s) 1710 may retrieve instructions to execute and data to process in order to execute the processes of some embodiments.

The bus 1705 may also connect to the input and output devices 1740 and 1745. The input devices may enable the user to communicate information and select commands to the electronic system. The input devices 1740 may include alphanumeric keyboards and pointing devices (also called "cursor control devices"). The output devices 1745 may display images generated by the electronic system. The output devices may include printers and display devices, such as cathode ray tubes (CRT) or liquid crystal displays (LCD). Some embodiments may include devices, such as a touchscreen, that function as both input and output devices.

Finally, as shown in FIG. 17, bus 1705 also couples electronic system 1700 to a network 1725 through a network adapter (not shown). In this manner, the computer may be a part of a network of computers (such as a local area network ("LAN"), a wide area network ("WAN"), an Intranet, or a network of networks, such as the Internet. Any or all components of the electronic system 1700 may be used in conjunction with the invention.

Some embodiments may include electronic components, such as microprocessors, storage, and memory, that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments may be performed by one or more integrated circuits, such as application specific integrated circuits (ASICs) or field programmable gate arrays (FPGAs). In some embodiments, such integrated circuits execute instructions that are stored on the circuit itself. Some of the present embodiments may include flexible circuit, also rereferred to as flexible printed circuit boards (PCBs). The flexible circuits may provide dynamic flexing and increased heat dissipation and may be used in the embodiments that require circuits with smaller footprint, increased package density, more tolerance to vibrations, and/or less weight.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention may be embodied in other specific forms without departing from the spirit of the invention. In addition, a number of the figures (including FIGS. 9A, 9B, 10A, and 10B) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A water purification device, comprising:
    a pre-purified water reservoir configured to store pre-purified water;
    a water vapor chamber configured to receive water vapor generated from heating the pre-purified water in the pre-purified water reservoir;
    a condensation chamber configured to receive the water vapor and condense the water vapor into purified water;
    a Peltier device comprising a hot side and a cold side, wherein the hot side is configured to heat the pre-purified water into water vapor and the cold side is configured to condense condensing the water vapor into purified water; and
    a frame encompassing the pre-purified water reservoir, the water vapor chamber, the condensation chamber, and the Peltier device, the frame comprising an upper portion and a lower portion,
    wherein the pre-purified water reservoir is configured as an open bowl encompassed by the upper portion of the frame,
    wherein the condensation chamber is encompassed by the lower portion of the frame,
    wherein the upper portion of the frame is made of a material that is transparent to sunlight to allow the sunlight to reach the pre-purified water reservoir to heat up the pre-purified water, and
    wherein the lower portion is made of a material that is opaque to the sunlight to prevent the sunlight from reaching the condensation chamber.

2. The water purification device of claim 1 further comprising:
    a pre-purified water input channel configured to receive the pre-purified water into the pre-purified water reservoir;
    a pre-purified water output channel configured to transfer at least a portion of the pre-purified water out of the water purification device; and
    a purified water output channel configured to transfer the purified water out of the water purification device.

3. The water purification device of claim 2,
    wherein the water purification device is a modular water purification device configured to connect to one or more other water purification devices in a cascade,
    wherein when the water purification device is configured as a first water purification device in the cascade, the pre-purified water input channel of the water purification device is configured to receive the pre-purified water from a source outside of the cascade,
    wherein when the water purification device is configured as a last water purification device in the cascade, the pre-purified water output channel of the water purification device is configured to transfer at least a portion of the pre-purified water to a reservoir outside of the cascade, and
    wherein when the water purification device is configured as a water purification device other than the first water purification device in the cascade, the pre-purified water input channel of the water purification device is configured to connect to the pre-purified water output channel of a previous water purification device in the cascade.

4. The water purification device of claim 1 further comprising a fan configured to move the water vapor from the water vapor chamber into the condensation chamber.

5. The water purification device of claim 1, wherein the upper portion material is configured to create a lens effect to focus the sunlight entering the upper chamber to heat the pre-purified water in the pre-purified water reservoir.

6. The water purification device of claim 1, wherein the lower portion comprises two layers substantially separated by vacuum.

7. The water purification device of claim 1 further comprising one or more solar panels configured to provide electricity to the Peltier device.

8. The water purification device of claim 7, wherein the solar panels are connected to the frame by one or more foldable arms.

9. The water purification device of claim 1 further comprising:
    a first valve configured to bring pre-purified water into the pre-purified water reservoir; and
    a second valve configured to transfer at least a portion of the pre-purified water out of the pre-purified water reservoir; and
    a controller configured to open and close the first and second, valves.

10. The water purification device of claim 9, wherein the controller is configured to:
    in a fill state of the water purification device, open the first valve to bring the pre-purified water into the pre-purified water reservoir, in a purification state of the water purification device, close the first and second valves and provide electricity to the Peltier device, and in a wash state of the water purification device, open the first valve to bring the pre-purified water into the pre-purified water reservoir, open the second valve to transfer the pre-purified water out of the pre-purified water reservoir, and disconnect the electricity from the Peltier device.

11. The water purification device of claim 10, wherein the controller is configured to:
   at a beginning of the fill state, disconnect the electricity from the Peltier device;
   after the beginning of the fill state and prior at an end of the fill state, provide the electricity to the Peltier device.

12. The water purification device of claim 10, wherein the controller is configured to:
   disconnect, at a beginning of the fill state, the electricity from the Peltier device; and
   provide the electricity to the Peltier device during the fill state when the pre-purified water has reached a threshold level in the pre-purified water reservoir.

13. The water purification device of claim 10, wherein the controller is configured to:
   disconnect, at a beginning of the fill state, the electricity from the Peltier device; and
   provide the electricity to the Peltier device after a threshold time period from the beginning of the fill state.

14. The water purification device of claim 10, wherein the water purification device is a modular water purification device configured to connect one or more other water purification devices in a cascade,
   wherein when the modular water purification device is configured as a last water purification device in the cascade, the controller is configured to close the second valve in the fill state to keep the pre-purified water inside the cascade; and
   wherein when the modular water purification device is not configured as the last water purification device in the cascade, the controller is configured to open the second valve in the fill state to transfer the pre-purified water to a next modular water purification device in the cascade.

15. The water purification device of claim 1 further comprising a set of one or more heating elements configured to heat the pre-purified water in the pre-purified water reservoir.

16. The water purification device of claim 15 further comprising:
   a temperature sensor inside the pre-purified water reservoir; and
   a controller configured to:
      receive temperature measurements from the temperature sensor; and
      determine whether or not to apply electricity to the set of heating elements based on the temperature of the pre-purified water in the pre-purified water reservoir.

17. The water purification device of claim 1 further comprising a valve and a purified water output channel configured to transfer purified water out of the water purification device.

18. The water purification device of claim 1 further comprising:
   a handle connected to a replaceable portion of the frame, wherein the replaceable portion of the frame is further connected to the Peltier device; and
   a controller configured to:
      determine a health status of the Peltier device based on at least one of a current drawn by the Peltier device and a temperature of the cold side of the Peltier device; and
      when, based on the health status, the Peltier device is determined to have failed, send a signal to a remote robot to pull the handle to remove the failed Peltier device and to insert a replacement Peltier device into the water purification device.

19. The water purification device of claim 1 further comprising:
   a set of one or more auxiliary heating elements configured to heat the pre-purified water in the pre-purified water reservoir;
   a temperature sensor inside the pre-purified water reservoir; and
   a controller configured to:
      receive, from the temperature sensor, a set of one or more temperature measurements of the pre-purified water;
      determine, based on the set of temperature measurements, whether or not a temperature of the hot side of the Peltier device is high enough to turn the pre-purified water into water vapor; and
      apply electricity to the set of auxiliary heating elements when the temperature of the hot side of the Peltier device is determined not to be high enough to turn the pre-purified water into water vapor.

* * * * *